(12) United States Patent
Park et al.

(10) Patent No.: US 11,953,578 B2
(45) Date of Patent: Apr. 9, 2024

(54) SINGLE SIDED BEAM MANAGEMENT FOR BISTATIC AIR INTERFACE BASED RADIO FREQUENCY SENSING IN MILLIMETER WAVE SYSTEMS

(71) Applicant: QUALCOMM Incorporated, San Diego, CA (US)

(72) Inventors: Sungwoo Park, Seoul (KR); Wooseok Nam, San Diego, CA (US); Tao Luo, San Diego, CA (US); Junyi Li, Fairless Hills, PA (US); Juan Montojo, San Diego, CA (US); Jing Sun, San Diego, CA (US); Xiaoxia Zhang, San Diego, CA (US); Peter Gaal, San Diego, CA (US); Taesang Yoo, San Diego, CA (US); Simone Merlin, San Diego, CA (US); Srinivas Yerramalli, Hyderabad (IN); John Edward Smee, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 297 days.

(21) Appl. No.: 17/362,295

(22) Filed: Jun. 29, 2021

(65) Prior Publication Data
US 2022/0026551 A1    Jan. 27, 2022

Related U.S. Application Data

(60) Provisional application No. 63/055,758, filed on Jul. 23, 2020.

(51) Int. Cl.
*G01S 13/00* (2006.01)
*G01S 13/72* (2006.01)

(52) U.S. Cl.
CPC .......... *G01S 13/003* (2013.01); *G01S 13/723* (2013.01)

(58) Field of Classification Search
None
See application file for complete search history.

(56) References Cited

U.S. PATENT DOCUMENTS

2016/0241348 A1    8/2016    Zirwas et al.
2019/0369201 A1    12/2019   Akkarakaran et al.
(Continued)

FOREIGN PATENT DOCUMENTS

WO    2020057748 A1    3/2020

OTHER PUBLICATIONS

International Search Report and Written Opinion—PCT/US2021/039801—ISA/EPO—dated Oct. 7, 2021.

*Primary Examiner* — Whitney Moore
(74) *Attorney, Agent, or Firm* — SUNSTEIN LLP/Qualcomm

(57) ABSTRACT

Techniques are provided for single sided beam management in a millimeter wave (mmW) communication system for use in bistatic radio frequency (RF) sensing. An example method of tracking targets with bistatic radio frequency sensing includes receiving a scanning reference signal, generating a scanning signal report indicating one or more target groups associated with the scanning reference signal, transmitting the scanning signal report, receiving tracking signal configuration information indicating a tracking reference signal associated with the one or more target groups, receiving the tracking reference signal identified in the tracking signal configuration information, and tracking the one or more target groups associated with the tracking reference signal.

28 Claims, 18 Drawing Sheets

(56) References Cited

U.S. PATENT DOCUMENTS

| | | | |
|---|---|---|---|
| 2020/0112355 A1* | 4/2020 | Park | H04B 7/0626 |
| 2021/0211908 A1* | 7/2021 | Jiang | H04L 5/0051 |
| 2021/0223376 A1* | 7/2021 | Luo | G01S 13/003 |

* cited by examiner

SINGLE SIDED BEAM MANAGEMENT FOR BISTATIC AIR INTERFACE BASED RADIO FREQUENCY SENSING IN MILLIMETER WAVE SYSTEMS

CROSS-REFERENCE TO RELATED APPLICATION

This application claims the benefit of U.S. Provisional Application No. 63/055,758, filed Jul. 23, 2020, entitled "SINGLE SIDED BEAM MANAGEMENT FOR BISTATIC AIR INTERFACE BASED RADIO FREQUENCY SENSING IN MILLIMETER WAVE SYSTEMS," which is assigned to the assignee hereof, and the entire contents of which are hereby incorporated herein for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

5G enables the utilization of mmW RF signals for wireless communication between network nodes, such as base stations, user equipments (UEs), vehicles, factory automation machinery, and the like. However, mmW RF signals can be used for other purposes as well. For example, mmW RF signals can be used in weapons systems (e.g., as short-range fire-control radar in tanks and aircraft), security screening systems (e.g., in scanners that detect weapons and other dangerous objects carried under clothing), medicine (e.g., to treat disease by changing cell growth), and the like.

SUMMARY

An example method of tracking targets with bistatic radio frequency sensing according to the disclosure includes receiving a scanning reference signal, generating a scanning signal report indicating one or more target groups associated with the scanning reference signal, transmitting the scanning signal report, receiving tracking signal configuration information indicating a tracking reference signal associated with the one or more target groups, receiving the tracking reference signal identified in the tracking signal configuration information, and tracking the one or more target groups associated with the tracking reference signal.

Implementation of such a method may include one or more of the following features. Indicating the one or more target groups may include generating target group identification information for each of the one or more target groups. Receiving the tracking reference signal may include receiving the tracking reference signal once for each one of the one or more target groups. The tracking signal configuration information may include a repetition pattern for the tracking reference signal. The method may further include determining a measurement value for the scanning reference signal with one or more receive beams, comparing the measurement value obtained on each of the one or more receive beams to a threshold value, and generating the scanning signal report based on the one or more receive beams with measurement values that are greater than the threshold value. The measurement value may be at least one of a reference signal received power (RSRP), a reference signal received quality (RSRQ), and a signal-to-interference-plus-noise ratio (SINR). The scanning reference signal may include at least one selected from a group consisting of a positioning reference signal (PRS), a tracking reference signal (TRS), a channel state information reference signal (CSI-RS), and a synchronization signal block (SSB). The tracking signal configuration information may be received via at least one of a radio resource control message, a medium access control control element, or a downlink control information message. The scanning signal report may be transmitted via at least one radio resource control message. Receiving the tracking reference signal may be in response to transmitting a tracking request to a base station.

An example method for single sided beam management in bistatic radio frequency sensing according to the disclosure transmitting a scanning reference signal, receiving a scanning signal report indicating one or more target groups associated with the scanning reference signal, transmitting tracking signal configuration information based on the scanning reference signal and the one or more target groups, and transmitting a tracking reference signal for each of the one or more target groups.

Implementations of such a method may include one or more of the following features. The scanning reference signal may include at least one selected from a group consisting of a positioning reference signal (PRS), a tracking reference signal (TRS), a channel state information reference signal (CSI-RS), and a synchronization signal block (SSB). Transmitting the tracking reference signal may be in response to receiving a tracking request from a user equipment. The scanning signal report may include a signal identification value of the scanning reference signal. The scanning signal report may include one or more target group identification values associated with the scanning reference signal. The scanning signal report may include a receive beam associated with a user equipment and a measurement value for the scanning reference signal received via the receive beam. The tracking reference signal may include at least one selected from a group consisting of a positioning reference signal (PRS), a tracking reference signal (TRS), a channel state information reference signal (CSI-RS), and a synchronization signal block (SSB). The tracking signal configuration information may include a repetition pattern for the tracking reference signal. The tracking signal configuration information may include target group identification information for each of the one or more target groups. The tracking signal configuration information may be transmitted via at least one of a radio resource control message, a medium access control control element, or a downlink control information message.

An example apparatus for tracking targets with bistatic radio frequency sensing according to the disclosure includes a memory, at least one transceiver, at least one processor communicatively coupled to the memory and the at least one transceiver and configured to receive a scanning reference signal, generate a scanning signal report indicating one or more target groups associated with the scanning reference signal, transmit the scanning signal report, receive tracking signal configuration information indicating a tracking reference signal associated with the one or more target groups, receive the tracking reference signal identified in the tracking signal configuration information, and track the one or more target groups associated with the tracking reference signal.

Implementations of such an apparatus may include one or more of the following features. The at least one processor may be further configured to generate target group identification information for each of the one or more target groups, and/or to receive the tracking reference signal once for each one of the one or more target groups. The tracking signal configuration information may include a repetition pattern for the tracking reference signal. The at least one processor may be further configured to determine a measurement value for the scanning reference signal with one or more receive beams, compare the measurement value obtained on each of the one or more receive beams to a threshold value, and generate the scanning signal report based on the one or more receive beams with measurement values that are greater than the threshold value. The measurement value is may be least one of a reference signal received power (RSRP), a reference signal received quality (RSRQ), and a signal-to-interference-plus-noise ratio (SINR). The scanning reference signal may include at least one selected from a group consisting of a positioning reference signal (PRS), a tracking reference signal (TRS), a channel state information reference signal (CSI-RS), and a synchronization signal block (SSB). The tracking signal configuration information may be received via at least one of a radio resource control message, a medium access control control element, or a downlink control information message. The scanning signal report may be transmitted via at least one radio resource control message. The tracking reference signal may be in response to transmitting a tracking request to a base station.

An example apparatus according to the disclosure includes a memory, at least one transceiver, at least one processor communicatively coupled to the memory and the at least one transceiver and configured to transmit a scanning reference signal, receive a scanning signal report indicating one or more target groups associated with the scanning reference signal, transmit tracking signal configuration information based on the scanning reference signal and the one or more target groups, and transmit a tracking reference signal for each of the one or more target groups.

Implementations of such an apparatus may include one or more of the following features. The scanning reference signal may include at least one selected from a group consisting of a positioning reference signal (PRS), a tracking reference signal (TRS), a channel state information reference signal (CSI-RS), and a synchronization signal block (SSB). Transmitting the tracking reference signal may be in response to receiving a tracking request from a user equipment. The scanning signal report may include a signal identification value of the scanning reference signal. The scanning signal report may include one or more target group identification values associated with the scanning reference signal. The scanning signal report may include a receive beam associated with a user equipment and a measurement value for the scanning reference signal received via the receive beam. The tracking reference signal may include at least one selected from a group consisting of a positioning reference signal (PRS), a tracking reference signal (TRS), a channel state information reference signal (CSI-RS), and a synchronization signal block (SSB). The tracking signal configuration information may include a repetition pattern for the tracking reference signal. The tracking signal configuration information may include target group identification information for each of the one or more target groups. The tracking signal configuration information is transmitted via at least one of a radio resource control message, a medium access control control element, or a downlink control information message.

An example apparatus for tracking targets with bistatic radio frequency sensing according to the disclosure includes means for receiving a scanning reference signal, means for generating a scanning signal report indicating one or more target groups associated with the scanning reference signal, means for transmitting the scanning signal report, means for receiving tracking signal configuration information indicating a tracking reference signal associated with the one or more target groups, means for receiving the tracking reference signal identified in the tracking signal configuration information, and means for tracking the one or more target groups associated with the tracking reference signal.

An example apparatus according to the disclosure includes means for transmitting a scanning reference signal, means for receiving a scanning signal report indicating one or more target groups associated with the scanning reference signal, means for transmitting tracking signal configuration information based on the scanning reference signal and the one or more target groups, and means for transmitting a tracking reference signal for each of the one or more target groups.

An example non-transitory processor-readable storage medium comprising processor-readable instructions configured to cause one or more processors to track targets with bistatic radio frequency sensing according to the disclosure includes code for receiving a scanning reference signal, code for generating a scanning signal report indicating one or more target groups associated with the scanning reference signal, code for transmitting the scanning signal report, code for receiving tracking signal configuration information indicating a tracking reference signal associated with the one or more target groups, code for receiving the tracking reference signal identified in the tracking signal configuration information, and code for tracking the one or more target groups associated with the tracking reference signal.

An example non-transitory processor-readable storage medium comprising processor-readable instructions configured to cause one or more processors to perform single sided beam management in bistatic radio frequency sensing according to the disclosure includes code for transmitting a scanning reference signal, code for receiving a scanning signal report indicating one or more target groups associated with the scanning reference signal, code for transmitting tracking signal configuration information based on the scanning reference signal and the one or more target groups, and code for transmitting a tracking reference signal for each of the one or more target groups.

Items and/or techniques described herein may provide one or more of the following capabilities, as well as other capabilities not mentioned. A base station may transmit one or more scanning reference signals. A user equipment may receive one of the scanning reference signals via multiple non-line of sight paths via one or more receive beams. Target groups may be identified based on measurement values of the received reference signal. A scanning signal report identifying one or more target groups associated with the scanning reference signal may be sent to the base station. A tracking reference signal may be transmitted by the base station for each of the one or more target groups. The user equipment may track the target groups associated with each of the transmitted tracking reference signals. The tracking reference signal may be quasi co-located with the scanning reference signal associated with the target groups. Messaging overhead for radio frequency sensing may be reduced. Other capabilities may be provided and not every implementation according to the disclosure must provide any, let alone all, of the capabilities discussed.

BRIEF DESCRIPTION OF THE DRAWINGS

The accompanying drawings are presented to aid in the description of examples of one or more aspects of the disclosed subject matter and are provided solely for illustration of the examples and not limitations thereof.

DETAILED DESCRIPTION

Figure 1:
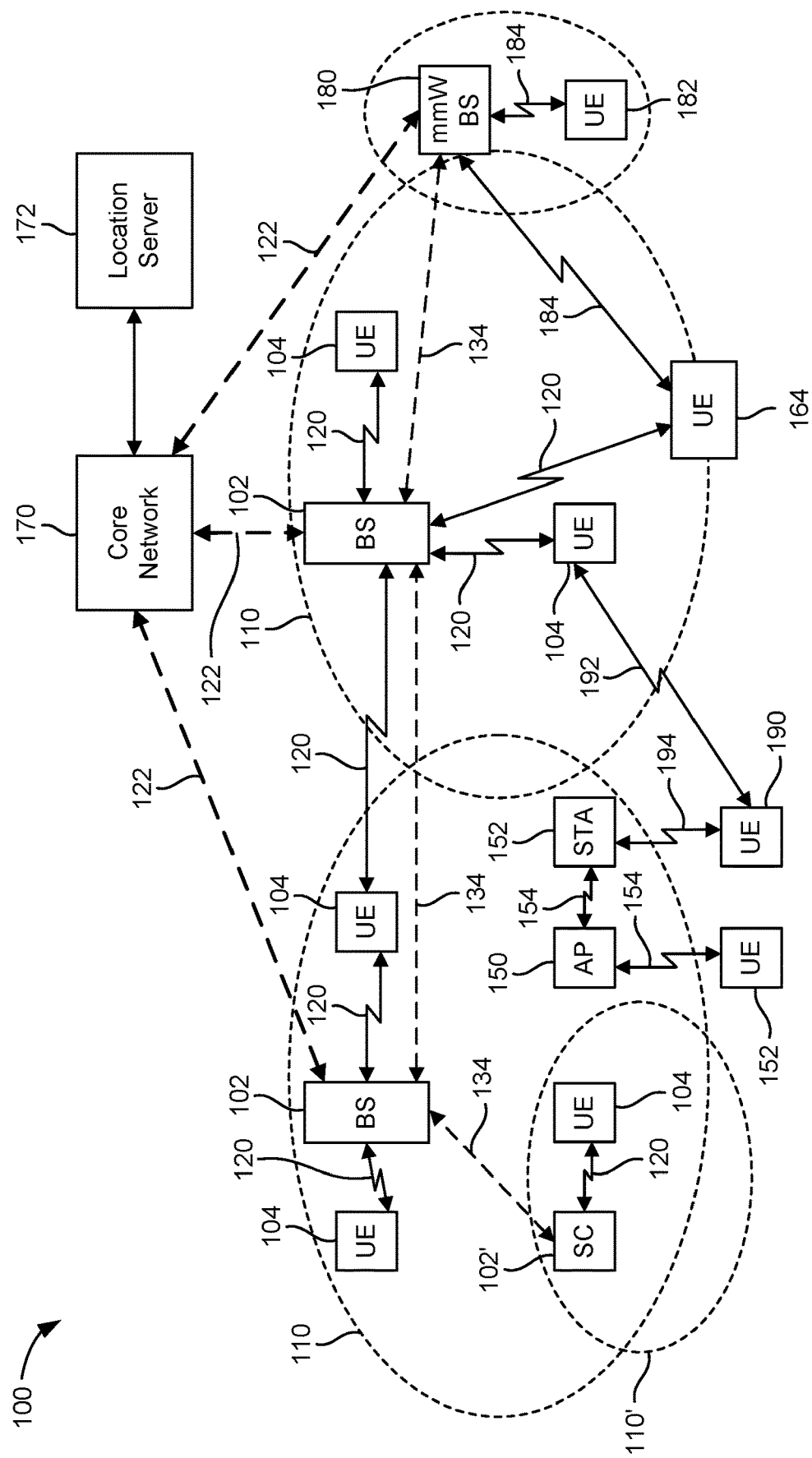
FIG. 1 illustrates an example wireless communications system, according to various aspects of the disclosure.

Techniques are provided herein for single sided beam management in a millimeter wave (mmW) communication system for use in bistatic radio frequency (RF) sensing. RF sensing may be regarded as consumer-level radar with advanced detection capabilities. For example, RF sensing may be used in applications such as health monitoring (e.g., heartbeat detection, respiration rate monitoring, etc.), gesture recognition (e.g., human activity recognition, keystroke detection, sign language recognition), contextual information acquisition (e.g., location detection/tracking, direction finding, range estimation), automotive Radar (e.g., smart cruise control, collision avoidance) and the like. In an example, mmW RF signals such as 3GPP NR FR2/FR2x/FR4 are particularly suited for range detection applications. The systems and methods herein provide beam management methods to enable the base stations (BSs) and/or user equipment (UEs) to utilize RF sensing and object tracking with a single reference signal. For example, during a scanning phase a BS may be configured to transmit one or more sensing-scanning reference signals (SSRS) and one or more stations (e.g., BS, UEs) may be configured to provide beam reports identifying target groups associated with a single SSRS. The BS may be configured to select one or more target groups for tracking based on the beam reports. In a tracking phase, the BS may be configured to provide sensing-tracking information to a stations and repeatedly transmit a sensing-tracking reference signal (STRS) to enable the station to track the one or more targets groups associated with the STRS. These techniques are examples only, and not exhaustive.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" (BS) are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Referring to FIG. 1, an example wireless communications system 100 is shown. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
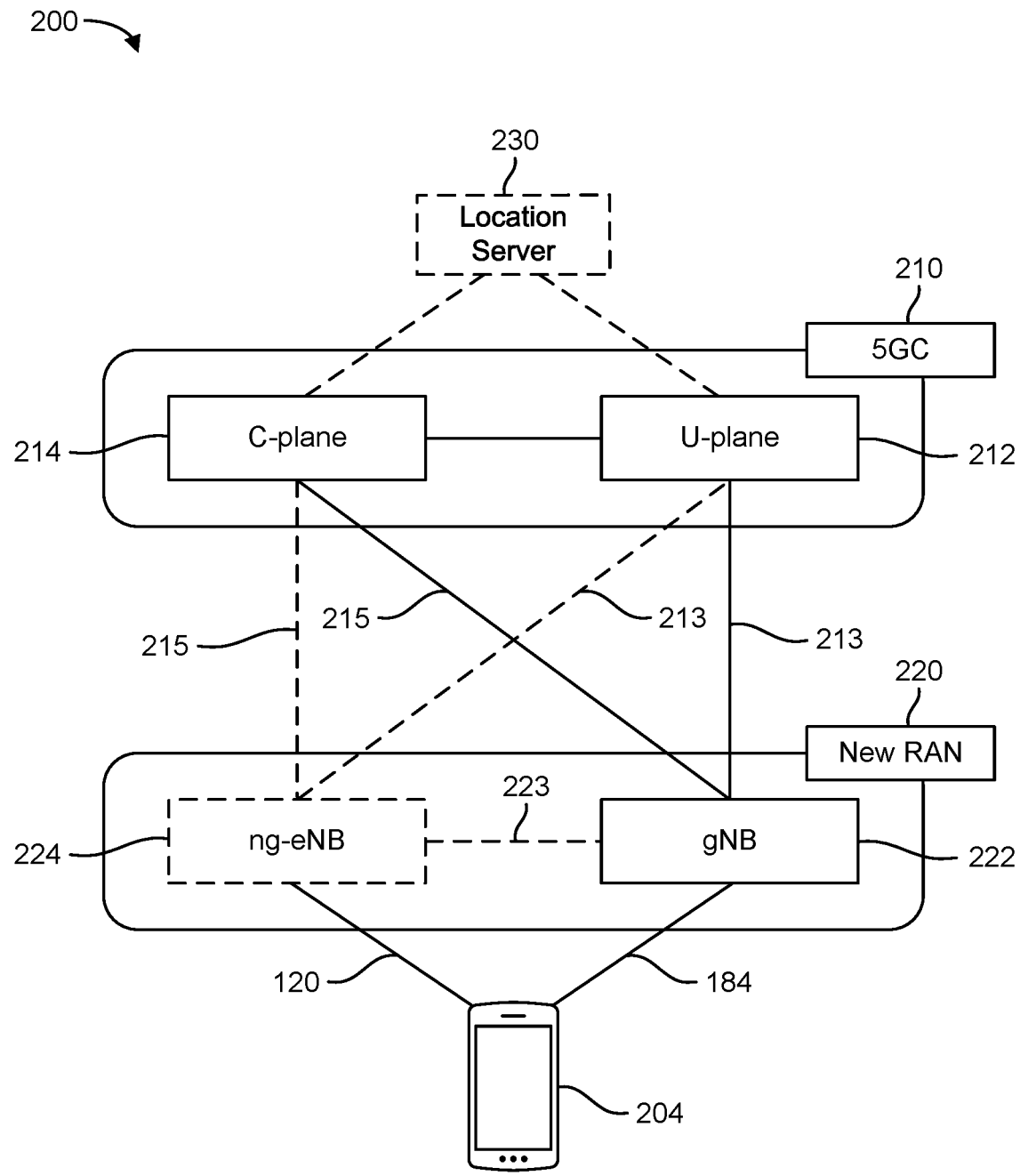
FIGS. 2A and 2B illustrate example wireless network structures, according to various aspects of the disclosure.

Referring to FIG. 2A, an example wireless network structure 200 is shown. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
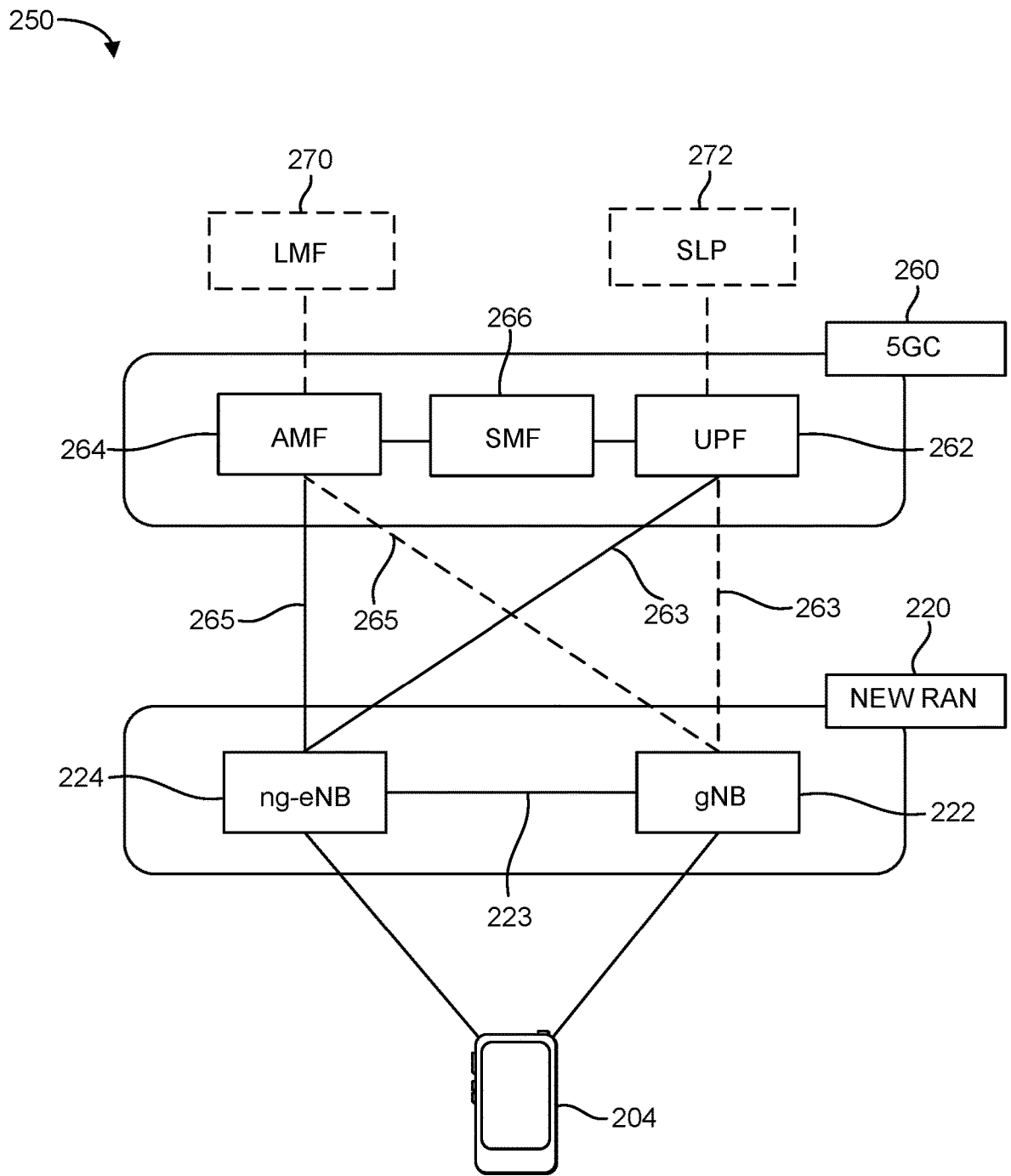

Referring to FIG. 2B, another example wireless network structure 250 is shown. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated into a base station, such as the gNB 222 and/or the ng-eNB 224. When integrated into the gNB 222 and/or the ng-eNB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3A:
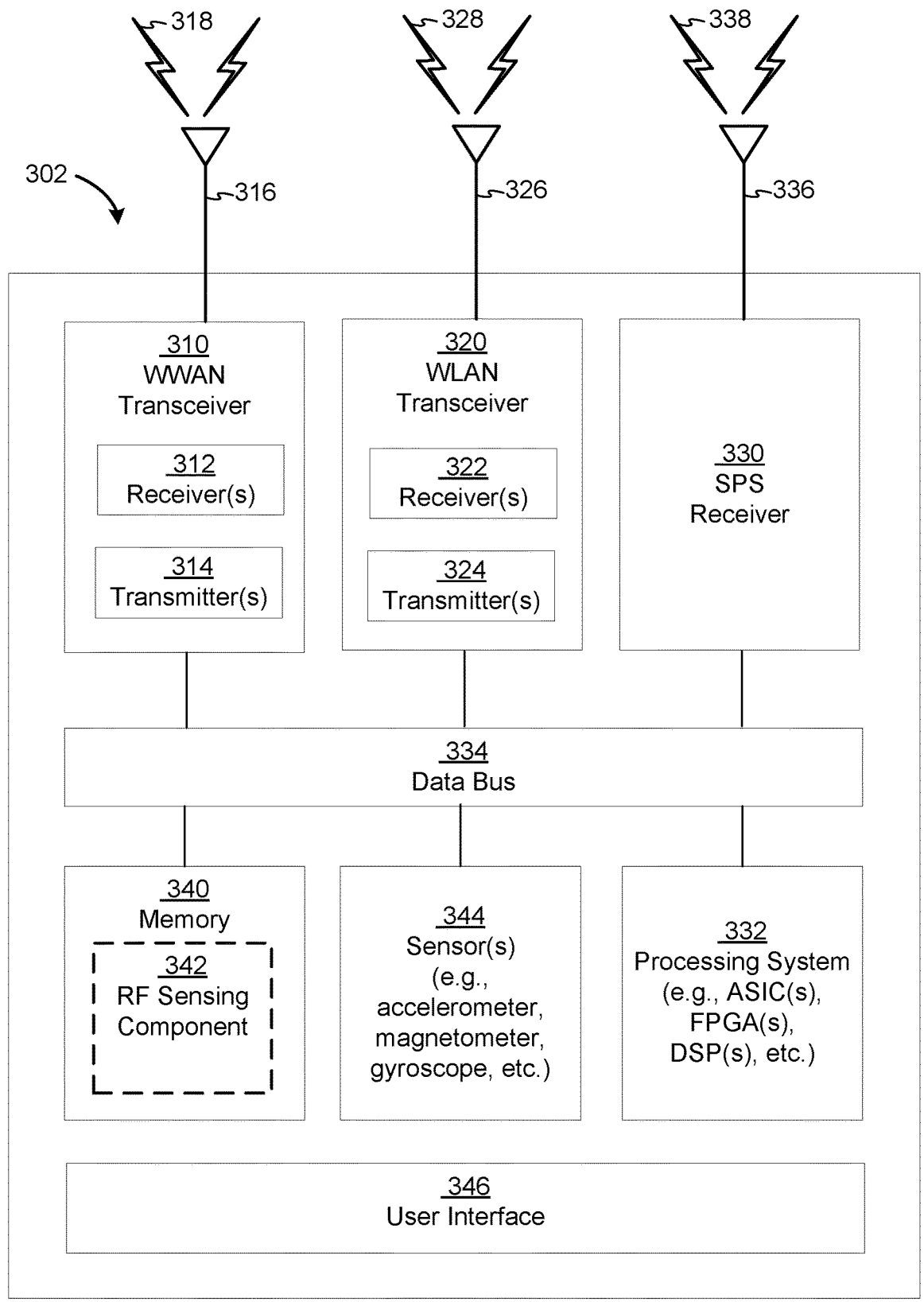
FIGS. 3A to 3C are simplified block diagrams of several sample aspects of components that may be employed in wireless communication nodes and configured to support communication as taught herein.
Figure 3B:
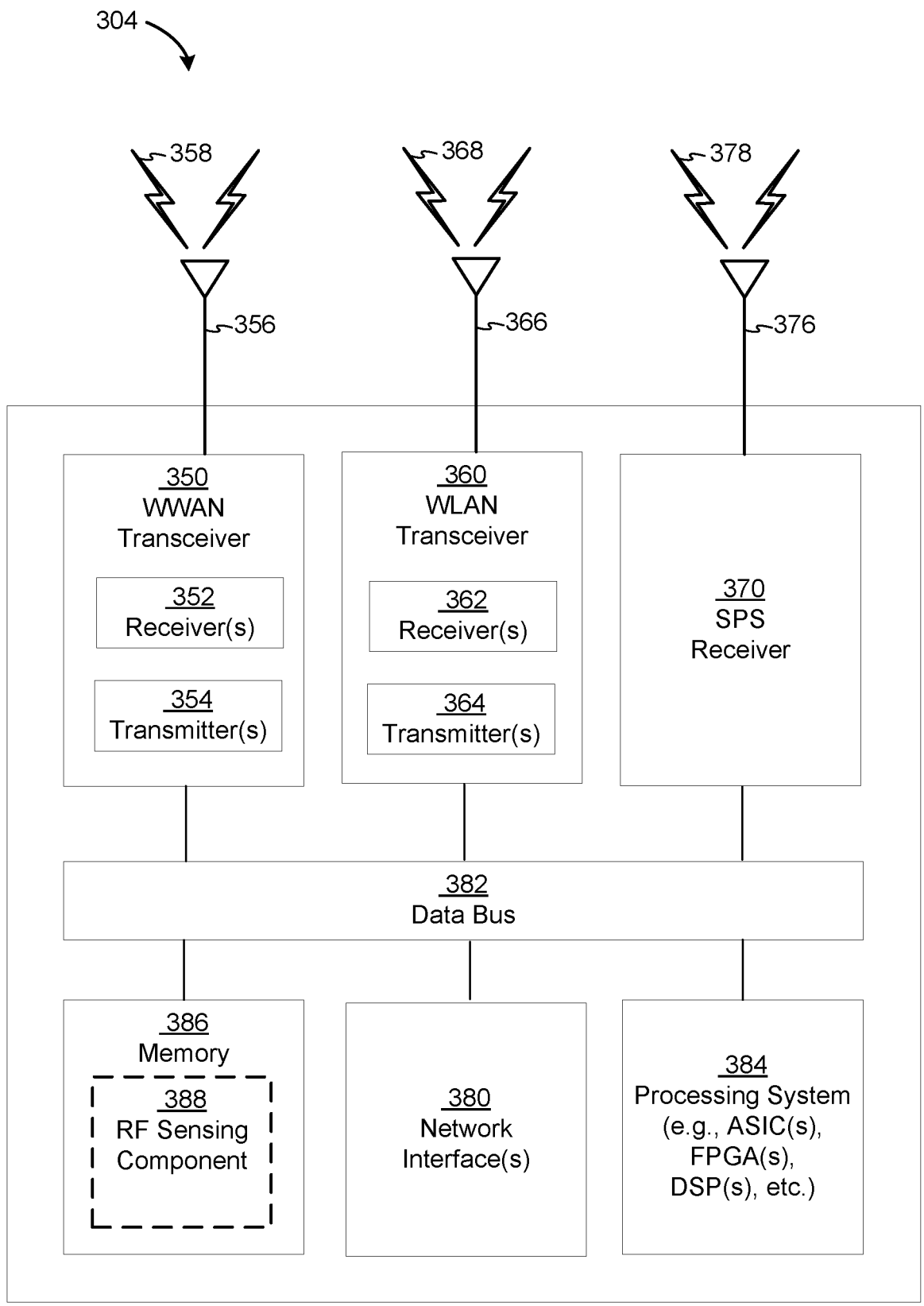
Figure 3C:
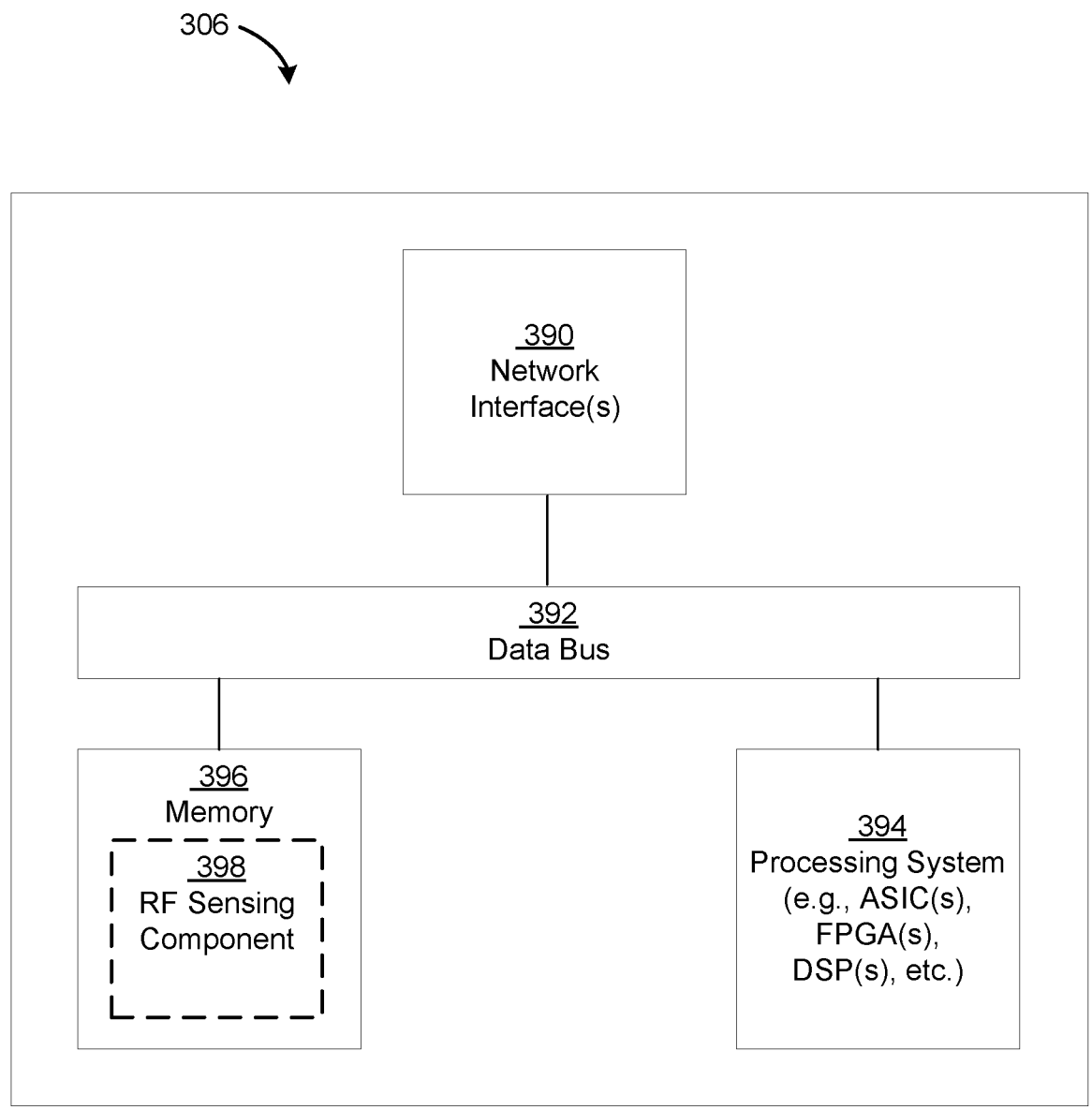

Referring to FIGS. 3A, 3B and 3C, several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations are shown. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the WWAN/WLAN transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, RF sensing, and for providing other processing functionality. The base station 304 includes a processing system 384 for providing functionality relating to, for example, RF sensing as disclosed herein, and for providing other processing functionality. The network entity 306 includes a processing system 394 for providing functionality relating to, for example, RF sensing as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include RF sensing components 342, 388, and 398, respectively. The RF sensing components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the RF sensing components 342, 388, and 398 may be external to the processing systems 332, 384, and 394 (e.g., part of a modem processing system, integrated with another processing system, etc.). Alternatively, the RF sensing components 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the RF sensing components 342, 388, and 398, etc.

Wireless communication signals (e.g., RF signals configured to carry OFDM symbols) transmitted between a UE and a base station can be reused for environment sensing (also referred to as "RF sensing" or "radar"). Using wireless communication signals for environment sensing can be regarded as consumer-level radar with advanced detection capabilities that enable, among other things, touchless/device-free interaction with a device/system. The wireless communication signals may be cellular communication signals, such as LTE or NR signals, WLAN signals, etc. As a particular example, the wireless communication signals may be an OFDM waveform as utilized in LTE and NR. High-frequency communication signals, such as mmW RF signals, are especially beneficial to use as radar signals because the higher frequency provides, at least, more accurate range (distance) detection.

Figure 4A:
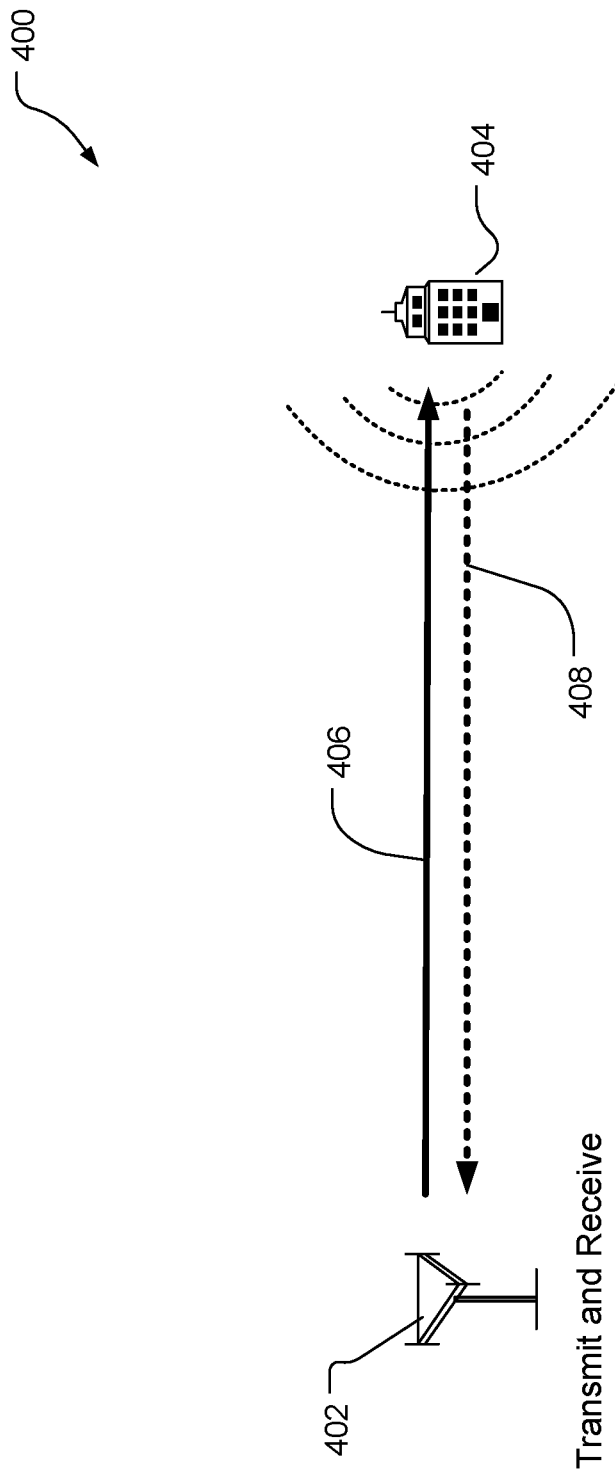
FIG. 4A illustrates an example monostatic radar system.
Figure 4B:
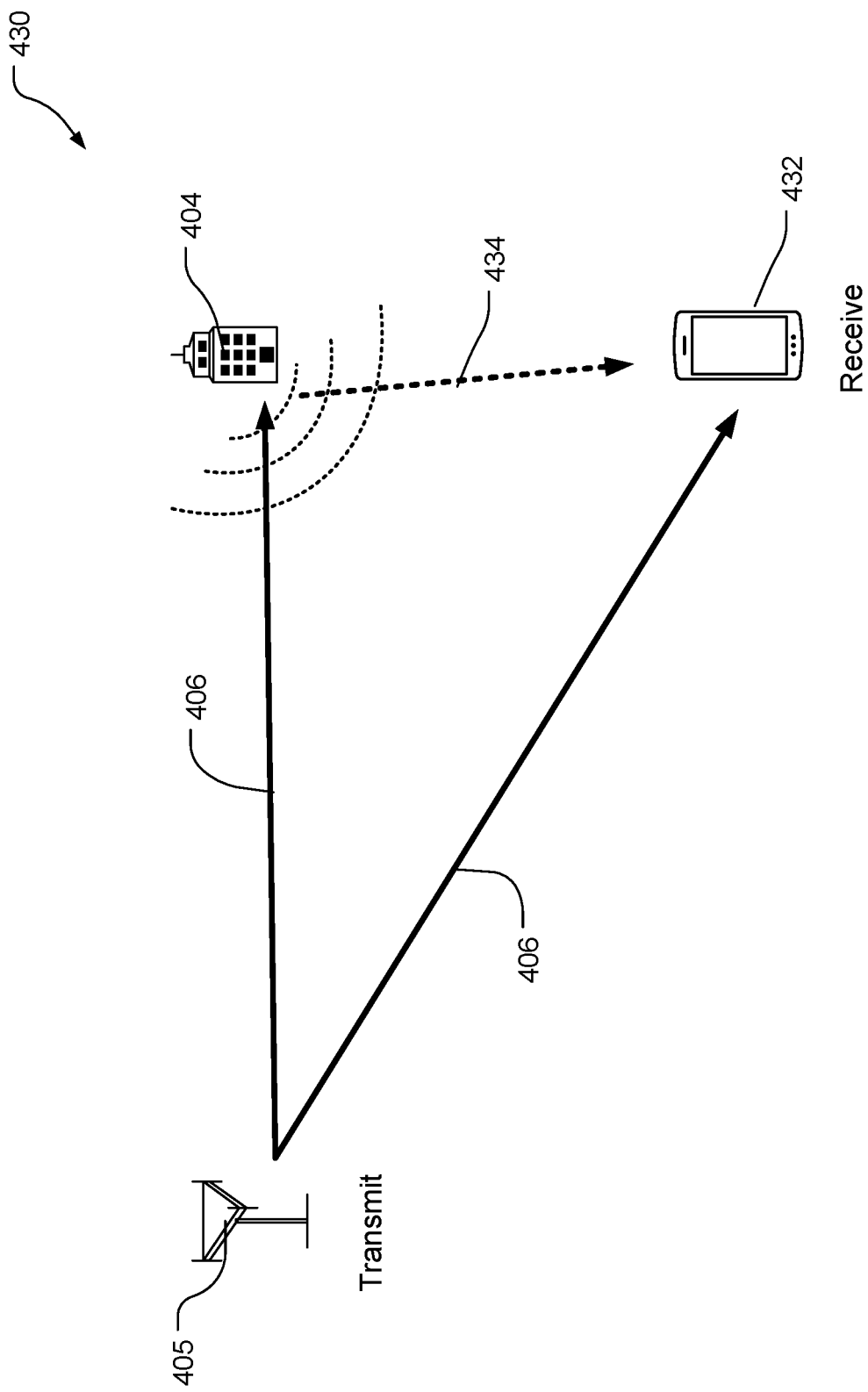
FIG. 4B illustrates an example bistatic radar system.

In general, there are different types of radar, and in particular, monostatic and bistatic radars. FIGS. 4A and 4B illustrate two of these various types of radar. Specifically, FIG. 4A is a diagram 400 illustrating a monostatic radar scenario, and FIG. 4B is a diagram 430 illustrating a bistatic radar scenario. In FIG. 4A, a base station 402 may be configured for full duplex operation and thus the transmitter (Tx) and receiver (Rx) are co-located. For example, a transmitted radio frequency (RF) signal 406 may be reflected off of a target object, such as a building 404, and the receiver on the base station 402 is configured to receive and measure a reflected beam 408. This is a typical use case for traditional, or conventional, radar. In FIG. 4B, a base station 405 may be configured as a transmitter (Tx) and a UE 432 may be configured as a receiver (Rx). In this example, the transmitter and the receiver are not co-located, that is, they are separated. In an example, the base station 405 may be configured to transmit the RF signal 406 as an omnidirectional downlink RF signal which may be received by the UE 432. A portion of the RF signal 406 may be reflected or refracted by the building 404 and the UE 432 may receive this reflected signal 434. This is the typical use case for wireless communication-based (e.g., WiFi-based, LTE-based, NR-based) RF sensing. Note that while FIG. 4B illustrates using a downlink RF signal as a RF sensing signal, uplink RF signals can also be used as RF sensing signals. In a downlink scenario, as shown, the transmitter is the base station 405 and the receiver is the UE 432, whereas in an uplink scenario, the transmitter is a UE and the receiver is a base station.

Referring to FIG. 4B in greater detail, the base station 405 transmits RF sensing signals (e.g., PRS) to the UE 432, but some of the RF sensing signals reflect off a target object such as the building 404. The UE 404 can measure the ToAs of the RF signal 406 received directly from the base station, and the ToAs of the reflected signal 434 which is reflected from the target object (e.g., the building 404).

The base station 405 may be configured to transmit the RF signal 406 as multiple RF signals to a receiver (e.g., the UE 432). However, the UE 432 may receive multiple RF signals corresponding to each transmitted RF signal due to the propagation characteristics of RF signals through multipath channels. Each path may be associated with a cluster of one or more channel taps. Generally, the time at which the receiver detects the first cluster of channel taps is considered the ToA of the RF signal on the line-of-site (LOS) path (i.e., the shortest path between the transmitter and the receiver). Later clusters of channel taps are considered to have reflected off objects between the transmitter and the receiver and therefore to have followed non-LOS (NLOS) paths between the transmitter and the receiver.

Thus, referring back to FIG. 4B, the RF signal 406 follows a LOS path between the base station 405 and the UE 432, and the reflected signal 434 represents the RF sensing signals that followed a NLOS path between the base station 405 and the UE 432 due to reflecting off the building 404 (or another target object). The base station 405 may have transmitted multiple RF sensing signals (not shown in FIG. 4B), some of which followed the LOS path and others of which followed the NLOS path. Alternatively, the base station 405 may have transmitted a single RF sensing signal in a broad enough beam that a portion of the RF sensing signal followed the LOS path and a portion of the RF sensing signal followed the NLOS path.

Based on the difference between the ToA of the LOS path, the ToA of the NLOS path, and the speed of light, the UE 432 can determine the distance to the building 404. In addition, if the UE 432 is capable of receive beamforming, the UE 432 may be able to determine the general direction to the building 404 as the direction of the reflected signal 434, which is the RF sensing signal following the NLOS path as received. The UE 432 may then optionally report this information to the transmitting base station 405, an application server associated with the core network, an external client, a third-party application, or some other entity. Alternatively, the UE 432 may report the ToA measurements to the base station 405, or other entity, and the base station 405 may determine the distance and, optionally, the direction to the target object.

Note that if the RF sensing signals are uplink RF signals transmitted by the UE 432 to the base station 405, the base station 405 would perform object detection based on the uplink RF signals just like the UE 432 does based on the downlink RF signals.

Figure 5:
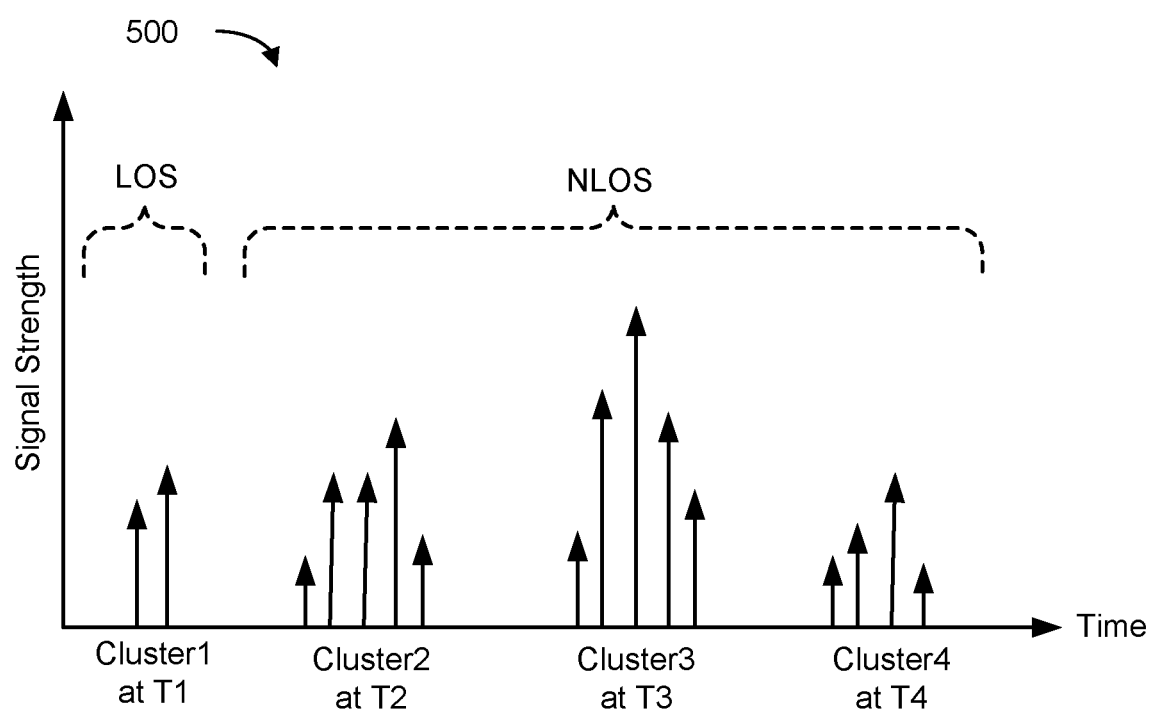
FIG. 5 is an example graph showing a radio frequency (RF) channel response over time.

Referring to FIG. 5, an example graph 500 showing an RF channel response at a receiver (e.g., any of the UEs or base stations described herein) over time is shown. In the example of FIG. 5, the receiver receives multiple (four) clusters of channel taps. Each channel tap represents a multipath that an RF signal followed between the transmitter (e.g., any of the UEs or base stations described herein) and the receiver. That is, a channel tap represents the arrival of an RF signal on a multipath. Each cluster of channel taps indicates that the corresponding multipaths followed essentially the same path. There may be different clusters due to the RF signal being transmitted on different transmit beams (and therefore at different angles), or because of the propagation characteristics of RF signals (potentially following widely different paths due to reflections), or both.

Under the channel illustrated in FIG. 5, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 5, because the first cluster of RF signals at time T1 arrives first, it is presumed to be the LOS data stream (i.e., the data stream arriving over the LOS or the shortest path), and may correspond to the LOS path illustrated in FIG. 4B (e.g., the RF signal 406). The third cluster at time T3 is comprised of the strongest RF signals, and may correspond to the NLOS path illustrated in FIG. 4B (e.g., the reflected signal 434). Note that although FIG. 5 illustrates clusters of two to five channel taps, as will be appreciated, the clusters may have more or fewer than the illustrated number of channel taps.

Figure 6:
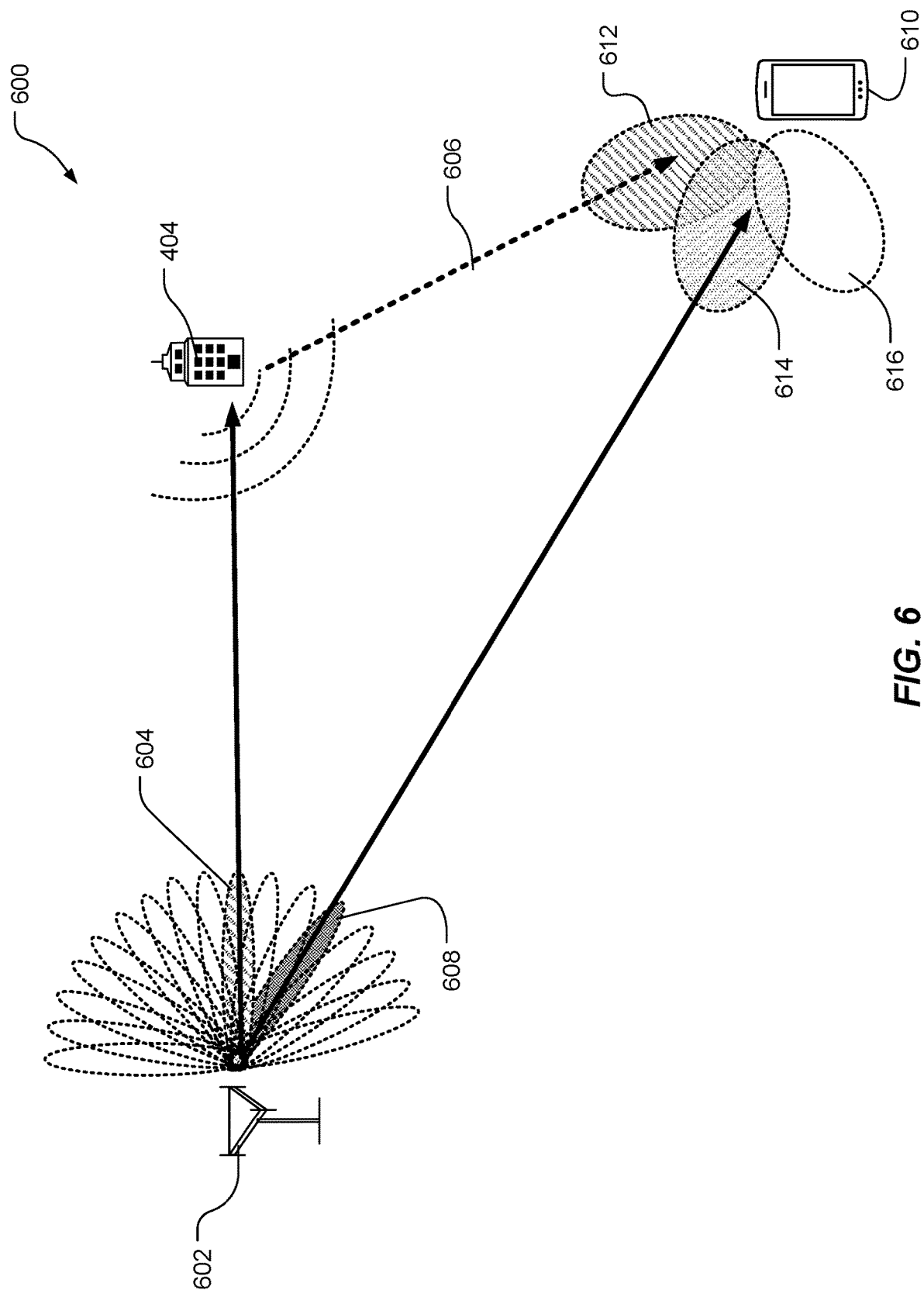
FIG. 6 illustrates an example single target beam management use case for bistatic radio frequency sensing.

Referring to FIG. 6, an example single target beam management use case 600 for bistatic radio frequency sensing is shown. The use case 600 includes a base station 602, such as a 5G NR gNB configured to transmit a plurality of beamformed signals along different azimuths and/or elevations, and a UE 610 configured to utilize receive beamforming to improve the gain of signals based on the angle of arrival. The base station 602 may be configured to generate N different reference beams and various azimuths, elevations, and/or beam widths. In an example the beams transmitted by the base station 602 may be based on SS Blocks, CSI-RS, TRS, or PRS resource sets. Other sensing and tracking reference signals may also be used. The UE 610 may be configured to utilize phase shifters and other software and hardware techniques to generate receive beams such as a first receive beam 612, a second receive beam 614, and a third receive beam 616. The UE 610 may also be configured to utilize beam forming for transmitted beams. The base station 602 may transmit a first reference signal 604 in the direction of a target object, such as the building 404, which may be reflected and the UE 610 may receive a reflected signal 606 with the first receive beam 612. The reflected signal 606 represents a NLOS path of the first reference signal 604 to the UE 610. The base station 602 also transmits a second reference signal 608 on a second beam. In an example, the second reference signal 608 may be quasi co-located (QCLed) with the first reference signal 604. The UE 610 receives the second reference signal 608 with the second receive beam 614. The second reference signal 608 is a LOS path to the UE 610.

In operation, the UE 610 may be configured to report the channel responses for each of the first and second reference signals 604, 608 to the base station 602 or another serving cell, and the base station 602 may be configured to manage the transmit beam and receive beam pairs for object sensing. For example, the base station 602 may be configured to provide transmit and receive beam identification information to the UE 610 to track an object such as the building 404. The beam identification information may be a transmission configuration indicator (TCI) sent in a DCI message which includes configurations such as QCL relationships between the transmit and receive beams.

Figure 7:
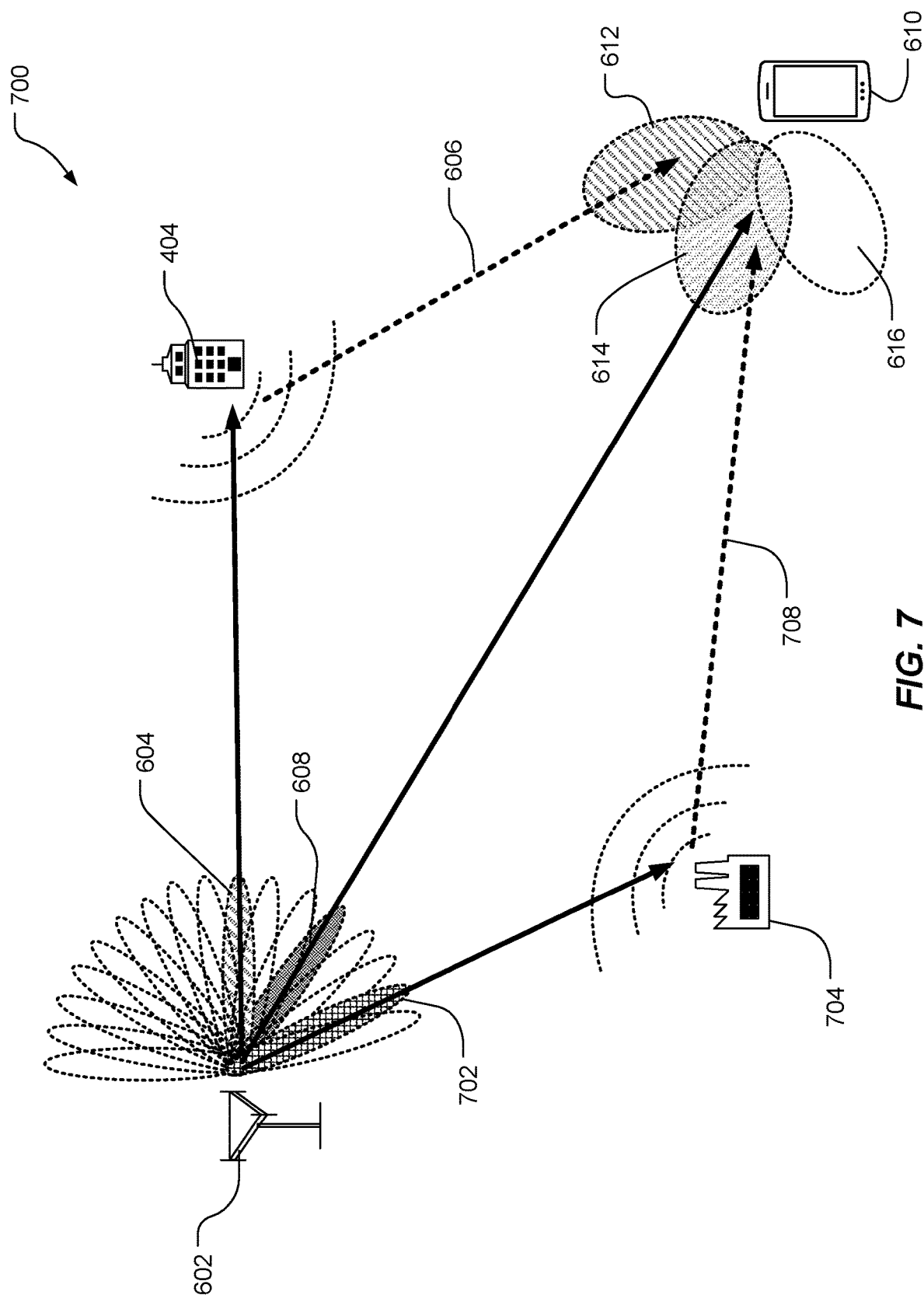
FIG. 7 illustrates an example multi-target beam management use case for bistatic radio frequency sensing.

Referring to FIG. 7, with further reference to FIG. 6, an example multi-target use case 700 for bistatic radio frequency sensing is shown. The use case 700 extends the single target use case 600 of FIG. 6 by including a second target. The second target may be a second building 704 as an example and not a limitation. The number and nature of the targets may vary based on the environment and the radio sensing application. In the use case 700, the base station 602 transmits a third reference signal 702 which is reflected by the second building 704, and the resulting reflected signal 708 is detected by the second receive beam 614 of the UE 610. The UE 610 may report the channel response for the third reference signal 702 with an indication that the measurement was obtained with the second receive beam 614. The base station 602 is configured to manage the beam pairs (i.e., the third reference signal 702, and the second receive beam 614) associated with the second target. Additional targets and the corresponding beam pairs may also be managed by the base station 602. The base station 602 may be configure to track one or more of the targets and thus may provide the corresponding beam pair information to the UE 610 as QCL/TCI for the respective targets.

Figure 8A:
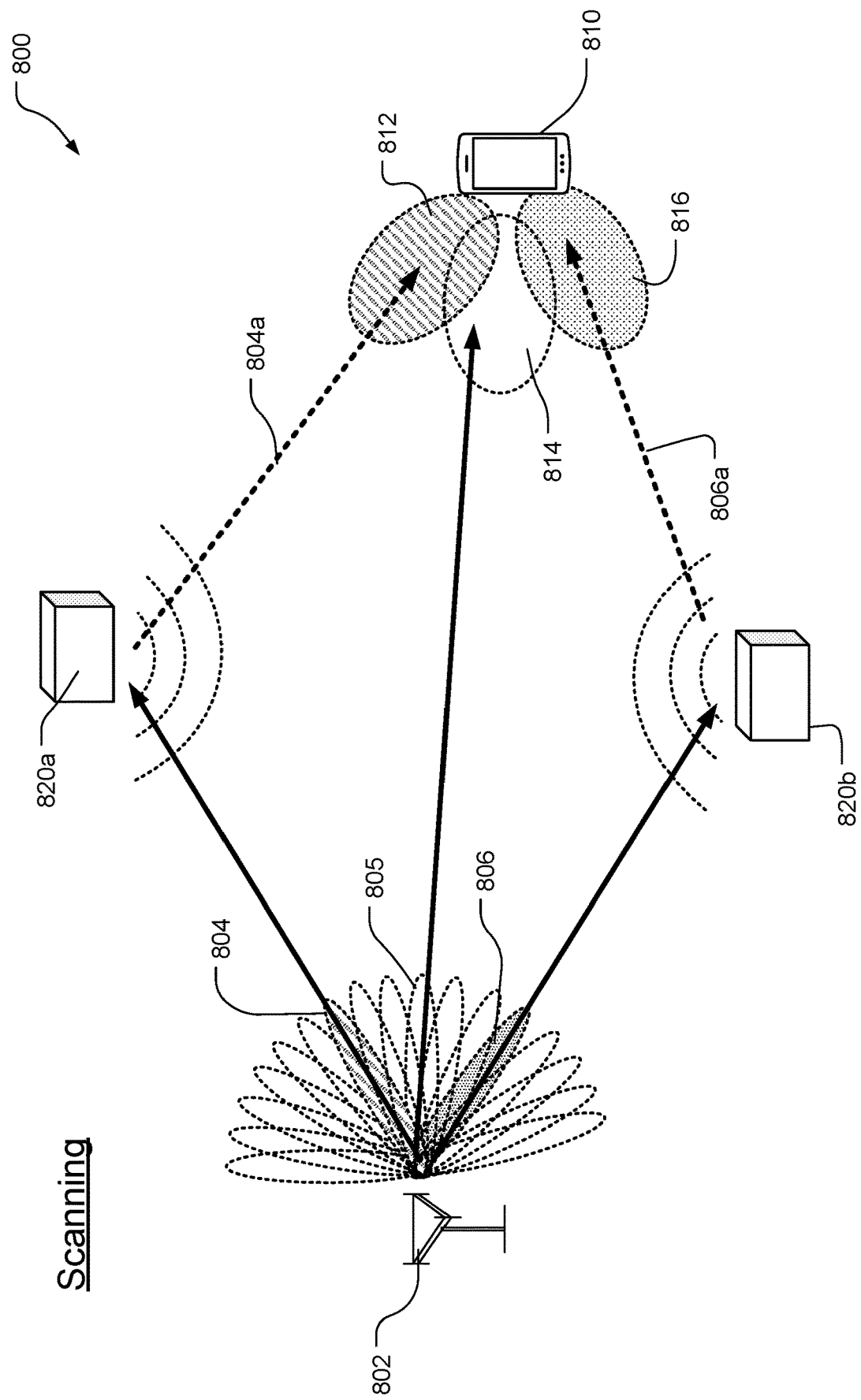
FIG. 8A illustrates an example scanning phase with bistatic radio frequency sensing.

Referring to FIG. 8A, an example scanning phase 800 with bistatic radio frequency sensing is shown. A base station 802 is an example of the base station 304 and is configured to transmit a plurality of beamformed reference signals at varying azimuths, elevations and/or beam widths. The reference signals may be SS Blocks, CSI-RS, TRS, PRS, or a sensing-scanning reference signal (SSRS) configured for RF sensing applications. A UE 810 is an example of the UE 302 and may be configured to perform receive beam scanning along different azimuths, elevation and/or beam widths relative to the orientation of the UE 810. In operation, the base station 802 may transmit one or more of the reference signals in a sequential order (i.e., beam sweeping), and the UE 810 is configured to beam sweep through different receive beams. The scanning phase 800 may be used to initially detect potential objects to be tracked via RF sensing. For example, a first reference signal 804 may be reflected by a first object 820a and a first reflected reference signal 804a may be detected by the UE 810. The UE 810 may cycle through different receive beams, such as a first receive beam 812, a second receive beam 814, and a third receive beam 816. As depicted in FIG. 8A, the first reflected reference signal 804a may be received with the first receive beam 812. The UE 810 may also detect a second reference signal 805 via a LOS path with the second receive beam 814. The beam sweeping on the base station 802 may generate a third reference signal 806 which is reflected on a second object 820b and a third reflected reference signal 806a is received by the UE 810 on the third receive beam 816.

In an embodiment, the UE 810 may be configured to detect a target based on the RSRP of the received signals. For example, the UE 810 may report that the RSRP values associated with the first reference signal 804 and the third reference signal 806 are above a threshold value. The threshold value may be a fixed value, or it may be scaled based on the RSRP of a LOS signal, such as the second reference signal 805. The UE 810 is configured to report one or more channel measurements (e.g., RSRP, RSRQ, SINR) associated with the received reference signals to the base station 802, or other network node. The measurements obtained during the scanning phase 800 may be used for a subsequent tracking phase.

Figure 8B:
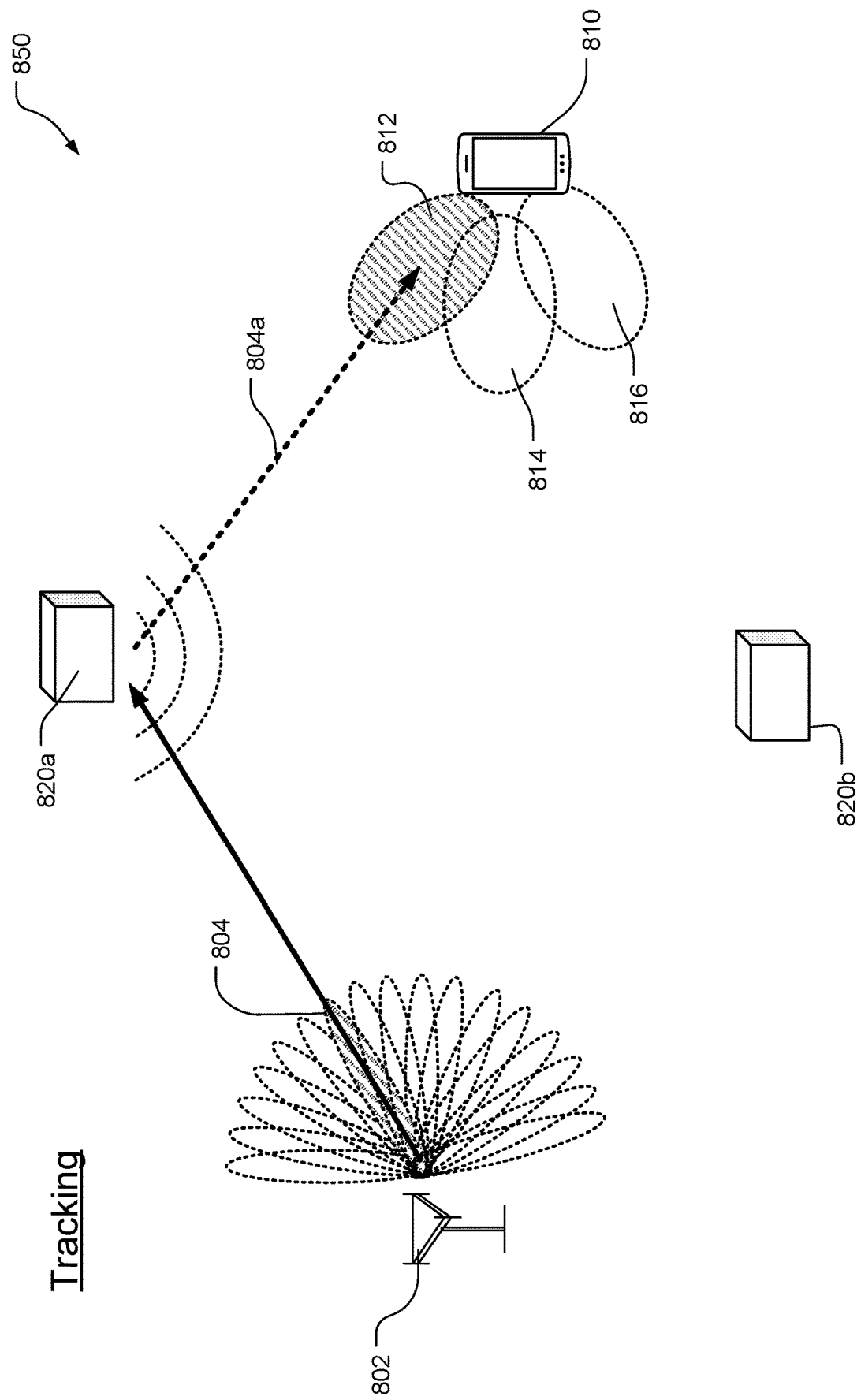
FIG. 8B illustrates an example tracking phase with bistatic radio frequency sensing.

Referring to FIG. 8B, with further reference to FIG. 8A, an example tracking phase 850 with bistatic radio frequency sensing is shown. Continuing the example of FIG. 8A, the base station 802 (or another network node in the wireless communications system 100) may determine to track one or more of the objects detected in the scanning phase 800. For example, the base station 802 may select to track the first object 820a and will send beam configuration information to the UE 810 to enable the UE 810 to track the first object 820a. The beam configuration information may include reference signal information and receive beam configuration information for the UE 810. The base station 802 may utilize a sensing-tracking reference signal (STRS) based on the first reference signal 804 to track or refine the measurements associated with the first object. In an example, the STRS may be QCLed with a corresponding SSRS (i.e., the first reference signal 804). SS Block, CSI-RS, TRS and PRS may be used as STRS. Other reference signals may also be developed and used as the STRS. The beam configuration information sent to the UE 810 may be sent via RRC, Medium Access Control Control Element (MAC-CE), DCI, or other signaling protocols. Upon receipt of the beam configuration information, the UE 810 may for example, use the first receive beam 812 with the STRS to detect the first object 820a.

The base station 802 may be configured to track multiple targets based on the number of reference signals the base station 802 may generate. In an embodiment, the base station 802 may be configured to track one object for each reference signal. For example, the base station 802 may track the second object 820b by generating a second STRS based on the third reference signal 806. The beam configuration information sent to the UE 810 may include the beam parameters for the second STRS and the corresponding receive beam information (e.g., the third receive beam 816) provided by the UE 810 during the scanning phase 800. Thus, the UE 810 may be configured to track both the first object 820a and the second object 820b. Additional objects, up to the number of reference signals generated by the base station 802, may be tracked.

Figure 8C:
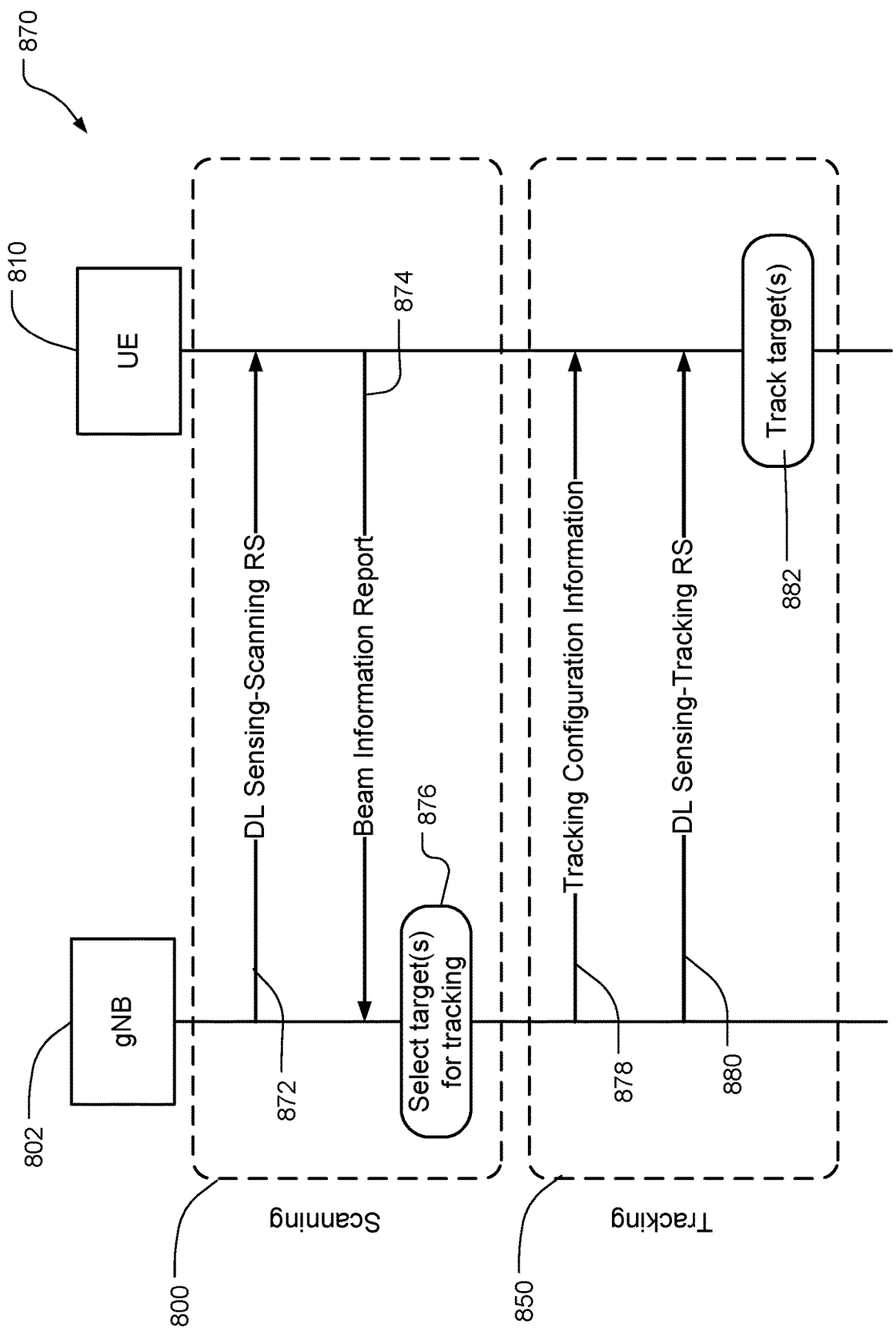
FIG. 8C is an example message flow for beam dependent target tracking with bistatic radio frequency sensing beam management.

Referring to FIG. 8C, with further reference to FIGS. 8A and 8B, an example message flow 870 for beam dependent target tracking with bistatic radio frequency sensing beam management is shown. The message flow 870 represents at least a portion of the signals exchanged between the base station 802 (e.g., a gNB) and the UE 810 during the scanning phase 800 and the tracking phase 850. The base station 802 transmits one or more DL scanning-sensing reference signals (DL SSRS) 872 such as the first reference signal 804, the second reference signal 805, and the third reference signal 806. The DL SSRS 872 may be SS Blocks, CSI-RS, TRS, PRS, or other existing or future reference signals configured for channel sounding or specifically for RF sensing measurements. The UE 810 is configured to send a beam information report 874 based on measurements associated with the received DL SSRS. The beam information report may include, for example, one or more of the RSRP, RSRQ, or SINR values associated with the DL SSRS which exceed a threshold value. The beam information report 874 may also include receive beam information associated with the DL SSRSs which exceed the threshold values. The beam information report 874 may be sent via RRC messaging or within other UL signaling.

At stage 876, the base station 802 is configured to select targets for tracking based at least in part on the beam information report 874 sent by the UE 810. The selection of objects for tracking may be based on upper level configuration parameters or other operational considerations. For example, an anticipated loss/degradation of a LOS path with a UE (e.g., due to extreme weather) may cause the network to require tracking of static objects. Further, while the examples in FIGS. 8A-8C depict a single base station and a single UE, additional base stations and UEs may be used to scan for and track objects. The SSRS may be associated with a specific base station and beam (e.g., TRP-ID with PRS-ID), and the network may be configured to aggregate the beam information reports arriving for beams associated with other base stations, and multiple UEs.

In the tracking phase 850, the base station 802 may transmit tracking configuration information 878 for the targets selected at stage 876. The tracking configuration information may include sensing-tracking reference signals (STRS) associated with each of the selected targets. The STRS may be QCLed with the corresponding SSRS 872 transmitted in the scanning phase 800. The tracking configuration information 878 may include receive beam information based on the beam information report 874. The tracking configuration information 878 may be provided via RRC, MAC-CE, DCI, or other network signaling. The tracking configuration information 878 may be specific for the UE 810, or specific for a selected target. The base station 802 transmits DL sensing-tracking reference signals (STRS) 880 based on the targets selected at stage 876. In an example, each target may be associated with a STRS 880. The STRS may be SS Blocks, CSI-RS, TRS, PRS or other current and future reference signals developed for RF sensing applications.

At stage 882, the UE 810 is configured to track the targets associated with the STRS 880. For example, the UE 810 may receive a STRS based on the first reference signal 804 with the first receive beam 812 to detect the first object 820a. If the second object 820b was also selected at stage 876, the UE 810 may be configured to receive a second STRS (which may be QCLed with the third reference signal 806) with the third receive beam 816. In an example, the STRS 880 may be periodic or aperiodic (e.g., event driven).

Figure 9A:
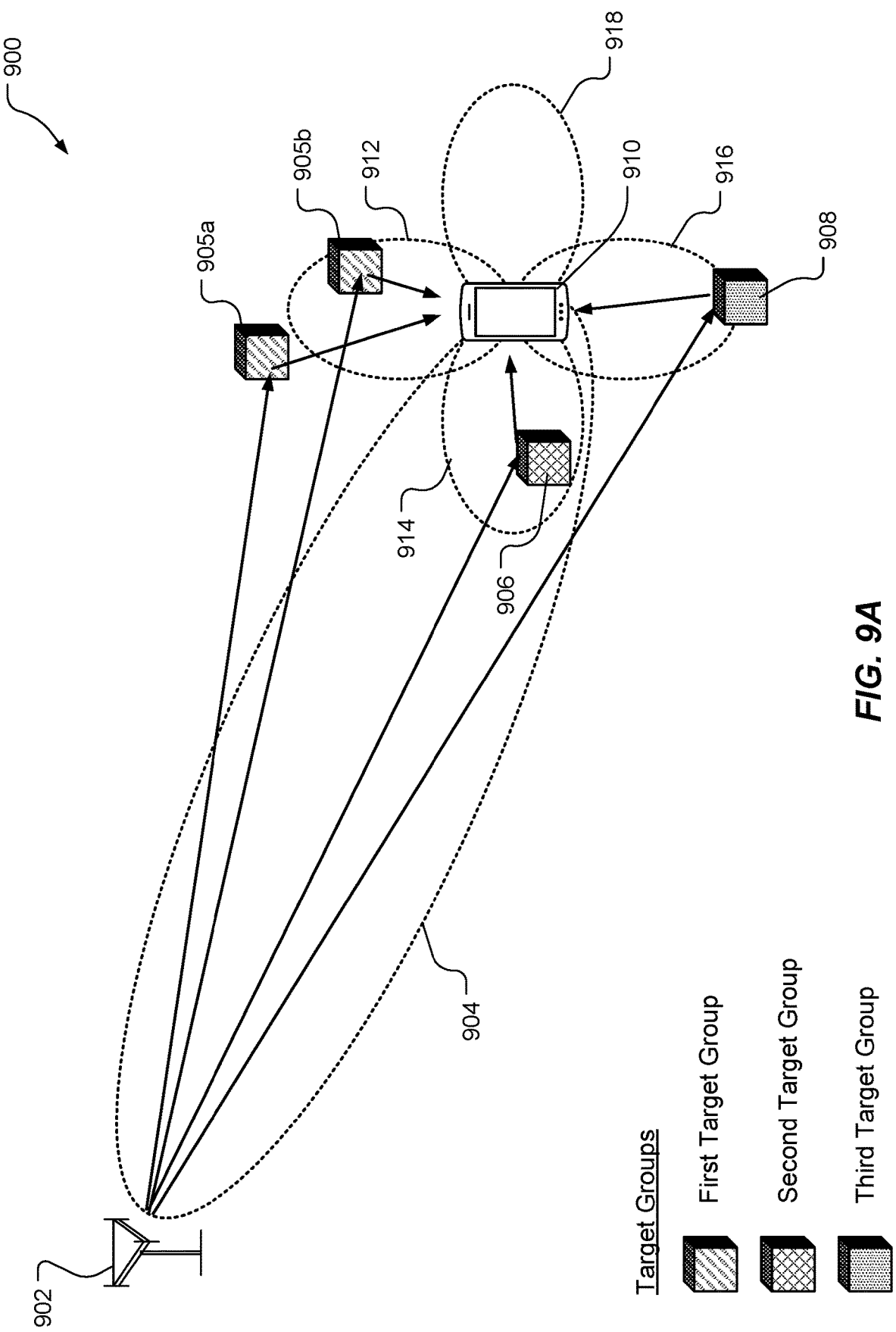
FIG. 9A illustrates an example use case of single sided beam management for bistatic radio frequency sensing.

Referring to FIG. 9A, an example use case 900 for single sided beam management for bistatic radio frequency sensing is shown. In contrast to the examples in FIGS. 8A-8C, where each target may be identified with a single reference signal, the use case 900 highlights scenarios when multiple target groups are detected with a single reference signal. For example, a base station 902 is an example of the base station 304 and is configured to transmit a plurality of beamformed reference signals at varying angles, elevations and/or beam widths. A first reference signal 904 may be configured as a SSRS and/or a STRS and is received by a UE 910 via multiple paths. For example, the first reference signal 904 may be reflected from a first target 905a and a second target 905b and received by a first receive beam 912. The first reference signal 904 may be received by a second receive beam 914 via a LOS path and via a NLOS path including a reflection from a third target 906. The first reference signal 904 may also be reflected off of a fourth target 908 and received via a third receive beam 916. Since all of the targets in FIG. 9A are associated with the same reference signal (i.e., the first reference signal 904), the first reference signal 904 is not sufficient to uniquely identify each target. In this use case, the UE 910 may be configured to assign explicit target group identifications to distinguish between target groups. In an embodiment, the target groups may be based on the receive beams 912, 914, 916. For example, a first target group includes the first target 905a and the second target 905b, a second target group includes the third target 906, and a third target group includes the fourth target 908. The relative locations and number of objects in the target groups are examples only and not limitations. The UE 910 may utilize wider or narrow receive beams and may be configured to distinguish the targets based on different receive beams and the corresponding reference signal measurements. For example, the RSRP for the first reference signal 904 may exceed a threshold when received on the first receive beam 912, the second receive beam 914, and the third receive beam 916. As depicted in FIG. 9A, the first reference signal 904 is not detected (or the RSRP is below a threshold value) on a fourth receive beam 918. The UE 910 may assign the first target 905a and the second target 905b a first target group identification (e.g., target group 1), the target 906 a second target group identification (e.g., target group 2), and the fourth target 908 a third target group identification (e.g., target group 3). The target group identifications and the corresponding reference signal identification information may be reported to the base station 902. In an embodiment, the UE 910 may be configured to provide the RSRP values and an indication of the corresponding receive beam to the base station 902, and the base station 902 (or other network node) may be configured to assign the target group identifications.

Figure 9B:
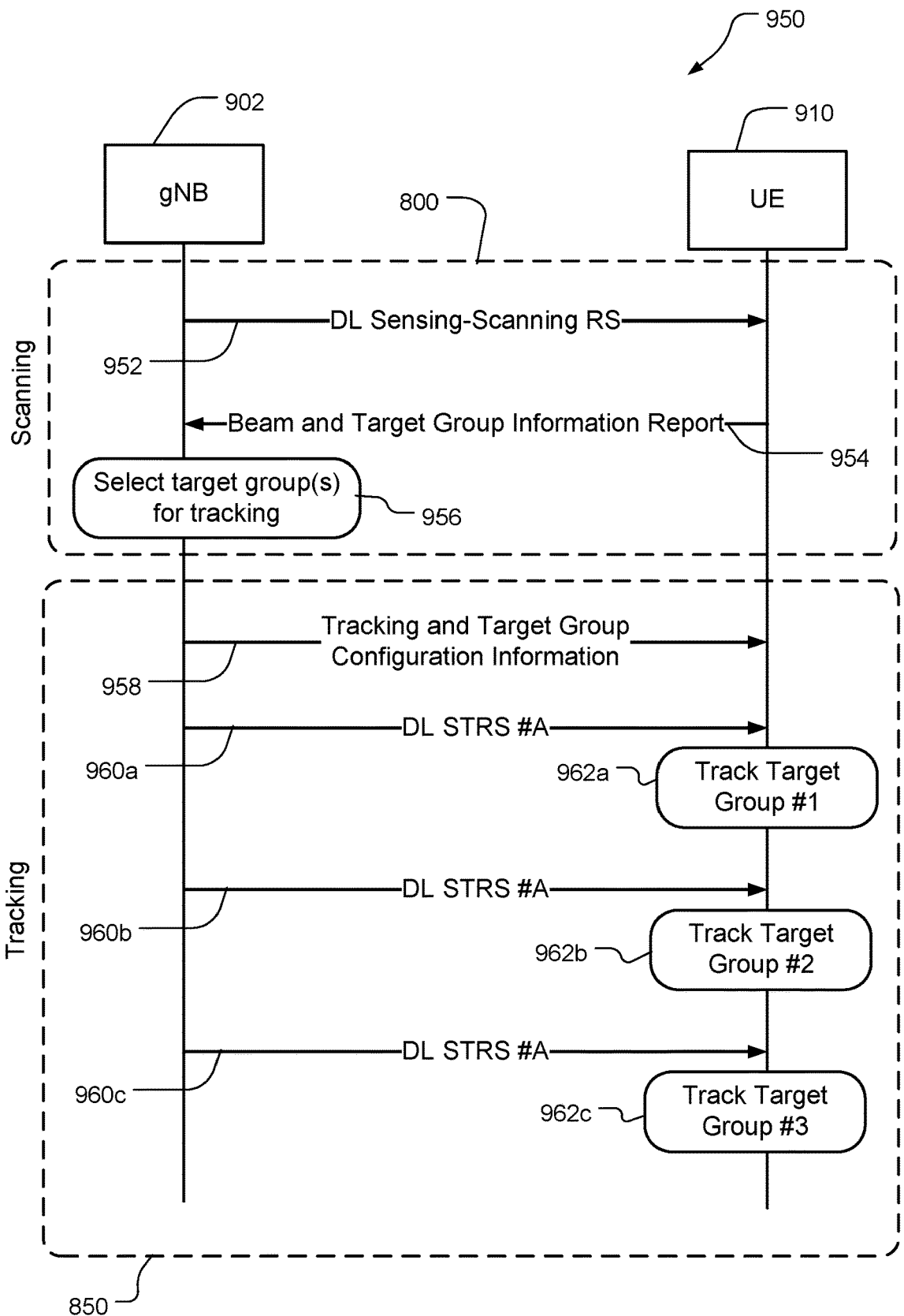
FIG. 9B is an example message flow for single sided bistatic radio frequency sensing beam management.

Referring to FIG. 9B, with further reference to FIG. 9A, an example message flow 950 for single sided bistatic radio frequency sensing beam management is shown. The message flow 950 represents at least a portion of the signals exchanged between the base station 902 (e.g., a gNB) and the UE 910 during the scanning phase 800 and the tracking phase 850. The base station 902 transmits one or more DL scanning-sensing reference signals (DL SSRS) 952 such as the first reference signal 904. The DL SSRS 952 may be SS Block, CSI-RS, TRS, PRS, or other existing or future reference signals configured for channel sounding or specifically for RF sensing measurements. The UE 910 is configured to send a beam and target group information report 954 based on measurements associated with a received DL SSRS. The beam and target group information report 954 may include, for example, one or more of the RSRP, RSRQ, or SINR values associated with the DL SSRS which exceed a threshold value. The beam and target group information report 954 may also include multiple target group identification values if multiple target groups are detected. For example, the target group identification values may be generated by the UE 910 based on objects detected by different receive beams, such as the first target group including the first and second targets 905a-b as detected by the first receive beam 912, the second target group including the third target 906 detected by the second receive beam 914, and the third target group including the fourth target 908 detected by the third receive beam 916. In an example, the UE 910 may include the receive beam identification information in the beam and target group information report 954. The base station 902 may be configured to assign different target group identification values based on the receive beam identification information. The beam and target group information report 954 may be sent via RRC messaging or within other UL signaling.

At stage 956, the base station 902 is configured to select one or more target groups for tracking based at least in part on the beam and target group information report 954 sent by the UE 910. The selection of target groups for tracking may be based on upper level configuration parameters or other operational considerations. Further, while the example in FIG. 9A depicts a single base station and a single UE, additional base stations and UEs may be used to scan for and track objects. The SSRS may be associated with a specific base station and beam (e.g., TRP-ID with PRS-ID), and the receive beam and/or target group identification values may be associated with a reporting UE (e.g., UE identification information). The network may be configured to aggregate the beam and target group information reports arriving for beams associated with other base stations, and multiple UEs.

In the tracking phase 850, the base station 902 may transmit tracking and target group configuration information 958 for the target groups selected at stage 956. The tracking and target group configuration information 958 may include the sensing-tracking reference signal (STRS) associated with the selected target groups. The STRS may be QCLed with the corresponding SSRS transmitted in the scanning phase 800. The tracking and target group configuration information 958 may include the target group identification information based on the beam and target group information report 954. The tracking and target group configuration information 958 may be provided via RRC, MAC-CE, DCI, or other network signaling. The tracking and target group configuration information 958 may be specific for the UE 910, or specific for one or more of the selected target groups. In operation, when multiple target groups are associated with a signal STRS (e.g., STRS #A depicted in FIG. 9B), the tracking and target group configuration information 958 indicates that the STRS is repeated a number of times equal to the number of target groups to be tracked. The tracking and target group configuration information 958 may also include the repetition pattern (e.g., period, time offset, interval, etc.) for the repeating STRS and the corresponding target group identifications for the target groups to be tracked.

The base station 902 is configured to transmit DL sensing-tracking reference signals (STRS) based on the target groups selected at stage 956 and the repetition pattern in the tracking and target group configuration information 958. For example, a first transmission 960a of the DL STRS #A enables the UE 910 to track the first target group at stage 962a, a second transmission 960b of the DL STRS #A enables the UE 910 to track the second target group at stage 962b, and a third transmission 960c enables the UE 910 to track the third target group. The STRSs 960a-c may be SS Blocks, CSI-RS, TRS, PRS or other current and future reference signals developed for RF sensing applications. The tracking at stages 962a-c may include obtaining one or more reference signal measurements such as RSRP, RSRQ, or SINR values associated with the DL STRS. The STRSs 960a-c may be QCLed with the SSRS 952, which is the bases for the beam and target group information report 954. In an example, the STRSs 960a-c may be event driven based on a tracking request received from the UE 910 or another network node.

Figure 10:
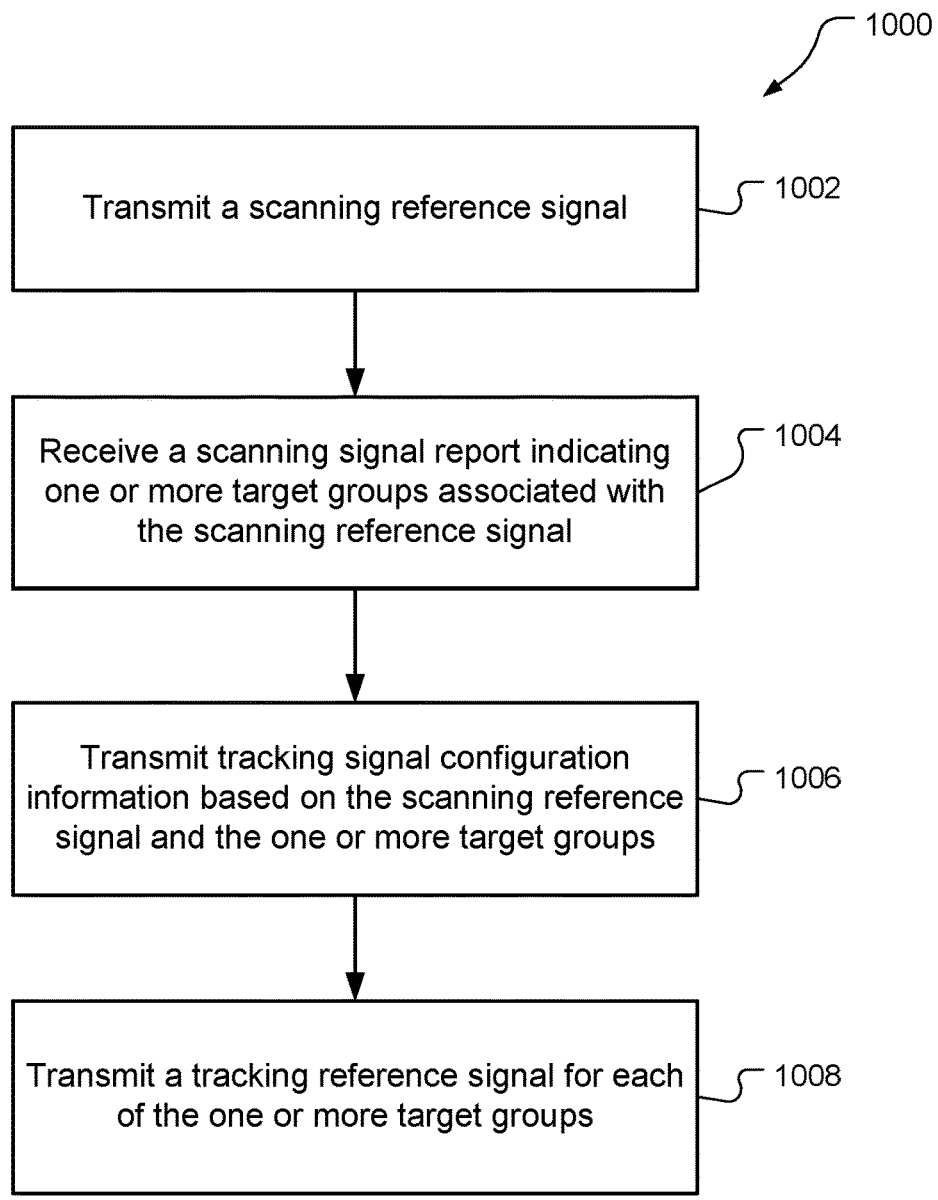
FIG. 10 is an example process flow for a method of single sided beam management in bistatic radio frequency sensing.

Referring to FIG. 10, with further reference to FIGS. 1-9B, a method 1000 for single sided beam management in bistatic radio frequency sensing includes the stages shown. The method 1000 is, however, an example only and not limiting. The method 1000 may be altered, e.g., by having stages added, removed, rearranged, combined, performed concurrently, and/or having single stages split into multiple stages.

At stage 1002, the method includes transmitting a scanning reference signal. A base station 304 is a means for transmitting the scanning reference signal. In a scanning phase 800, a base station, such as the base station 902 may be configured to transmit sensing-scanning reference signals (SSRS) in a coverage area. The SSRS may be beamformed existing communication reference signals such as SS Blocks, CSI-RS, TRS, PRS, or other existing or future reference signals configured for channel sounding or specifically for RF sensing measurements. A single SSRS may be received by a UE via LOS and NLOS paths. The NLOS paths may be reflected by one or more target groups. The scanning phase may be initiated periodically, or on-demand based on signals from the wireless communications system 100 or a UE. For example, a UE may transmit a tracking request to the base station 304 to initiate the scanning phase.

At stage 1004, the method includes receiving a scanning signal report indicating one or more target groups associated with the scanning reference signal. The base station 304 is a means for receiving the scanning signal report. In an example, a UE may receive the scanning reference signal transmitted at stage 1002 with one or more receive beams, and determine signal measurements such as RSRP, RSRQ, or SINR of the received signals. The UE may receive the signals via LOS and NLOS paths. One or more threshold values may be used to determine that a reference signal is reflecting off a target group associated with a receive beam. The UE may generate the scanning signal report to inform a base station of the signal identification value and the corresponding signal measurements. In an example, the UE may report identification information for the scanning reference signal which has a RSRP above a threshold level on one or more of the receive beams. The UE may include the receive beam information, and/or target group information in the scanning signal report. The beam and target group information report 954 is an example of the scanning signal report received by the base station 304.

At stage 1006, the method includes transmitting tracking signal configuration information based on the scanning reference signal and the one or more target groups. The base station 304 is a means for transmitting tracking signal configuration information. The base station 304 is configured to select a sensing tracking reference signal (STRS) based on the target groups and the corresponding SSRS identified in the scanning signal report received at stage 1004. The tracking signal configuration information includes beam parameter information to enable a UE to receive the STRS. In an example, the STRS may be QCLed with the corresponding SSRS transmitted at stage 1002. The tracking and target group configuration information 958 is an example of the tracking signal configuration information and may include the target group identification information based on beam and target group information in the scanning signal report received at stage 1004. The tracking signal configuration information may be transmitted via RRC, MAC-CE, DCI, or other network signaling. The tracking signal configuration information may be specific for a UE, or specific for one or more of the selected target groups. In an example, referring to FIG. 9B, when multiple target groups are associated with a signal STRS (e.g., STRS #A), the tracking signal configuration information indicates that the STRS is repeated a number of times equal to the number of target groups to be tracked. The tracking signal configuration information may also include the repetition pattern (e.g., period, time offset, interval, etc.) for the repeating STRS and the corresponding target group identifications for the target groups to be tracked.

At stage 1008, the method includes transmitting a tracking reference signal for each of the one or more target groups. The base station 304 is a means for transmitting the tracking reference signal. In an example, the STRS may be based on communication reference signals such as SS Blocks, CSI-RS, TRS, and PRS. Other reference signals, and future reference signals developed for RF sensing applications may also be used. The STRS is transmitted for each target group included in the tracking signal configuration information. For example, referring to FIG. 9B, the first, second and third target groups are identified in the tracking signal configuration and STRS #A is transmitted three times based on the repetition pattern (e.g., period, time offset, interval, etc.) provided in the tracking signal configuration. As an example, and not a limitation, the period may be 0.1 ms, 0.5 ms, 1 ms, 10 ms, 20 ms, etc. Other repetition patterns may also be used. In an example, a UE may be configured to provide updated signal measurement values based on the tracking reference signals transmitted at stage 1008. The updated measurement values may be included in a signal report which includes beam identification information, target group identification and the measurement values (e.g., RSRP, RSRQ, SINR, etc.). The signal report may be provided via RRC, MAC-CE, DCI, or other network signaling protocols.

Figure 11:
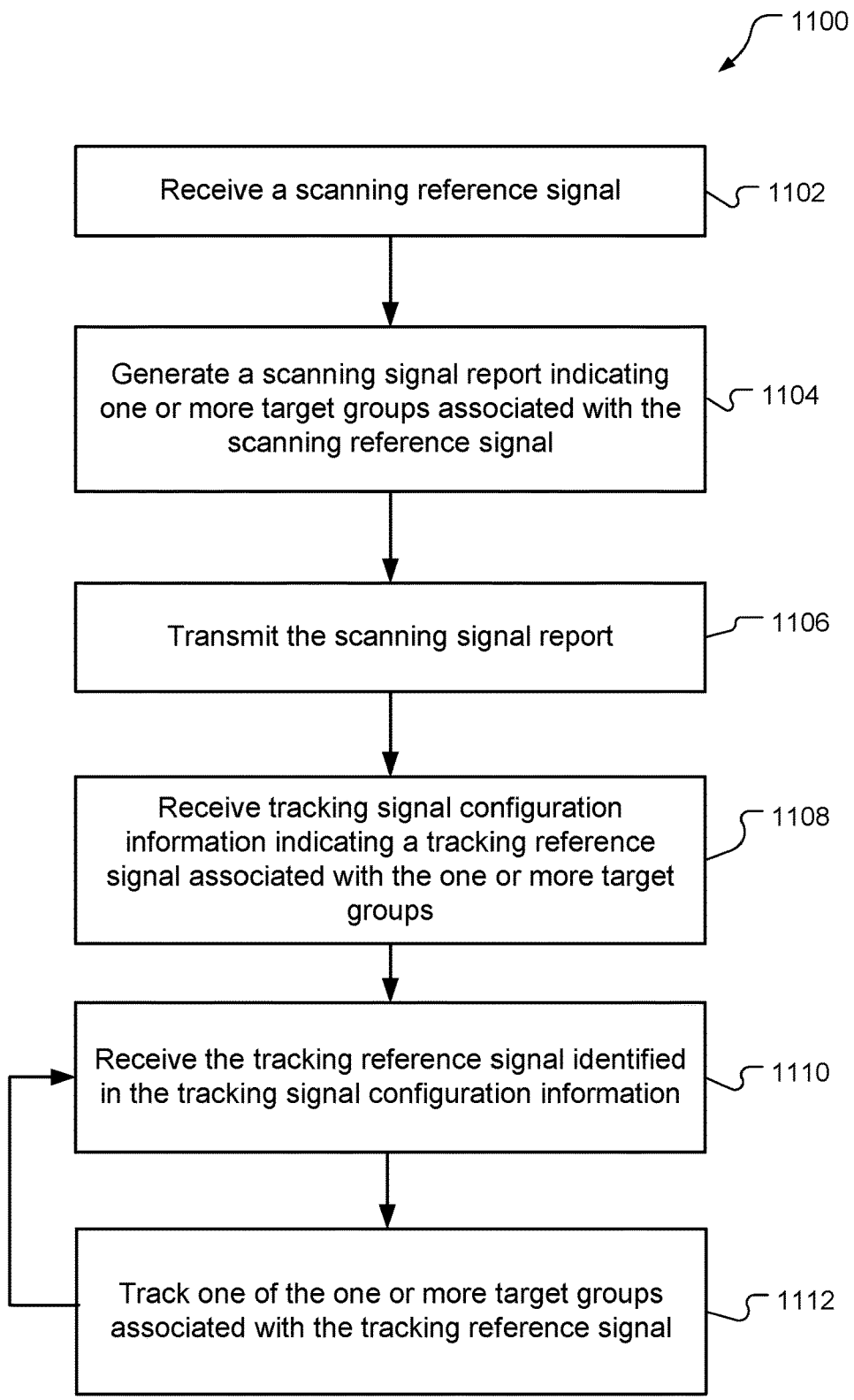
FIG. 11 is an example process flow for a method of tracking targets with bistatic radio frequency sensing.

Referring to FIG. 11, with further reference to FIGS. 1-9B, a method 1100 of tracking targets with bistatic radio frequency sensing includes the stages shown. The method 1100 is, however, an example only and not limiting. The method 1100 may be altered, e.g., by having stages added, removed, rearranged, combined, performed concurrently, and/or having single stages split into multiple stages.

At stage 1102, the method includes receiving a scanning reference signal. A UE 302 is a means for receiving a scanning reference signal. In a scanning phase 800, a base station, such as a base station 304 may be configured to transmit sensing-scanning reference signals (SSRS) in a coverage area. The SSRS may be beamformed existing communication reference signals such as SS Blocks, CSI-RS, TRS, PRS, or other existing or future reference signals configured for channel sounding or specifically for RF sensing measurements. The UE 304 may utilize one or more receive beams to receive the scanning reference signal. The scanning phase may be initiated periodically, or on-demand based on a tracking request or other signals from the wireless communications system 100 or the UE 302.

At stage 1104, the method includes generating a scanning signal report indicating one or more target groups associated with the scanning reference signal. The UE 302 is a means for generating the scanning signal report. In the scanning phase 800, the UE 302 may receive the signals with one or more receive beams via LOS and NLOS paths, and may determine signal measurements such as RSRP, RSRQ, or SINR based on the signal received by the receive beams. One or more threshold values may be used to determine that a reference signal is reflecting off a target group. The UE 302 may generate the scanning signal report to inform a base station 304 of the signal measurements in the scanning phase. In an example, the UE may report target group identification information for the receive beams which measure the RSRP of the scanning reference signal above a threshold level. The UE may optionally include the receive beam information in the scanning signal report. During the tracking phase 850, the UE 302 may be configured to refine the scanning signal report based on signal measurements obtained with tracking reference signals.

At stage 1106, the method includes transmitting the signal report. The UE 302 is a means for transmitting the signal report. In an example, the UE 302 may utilize RRC or other UL channels and/or UL messaging to provide the scanning signal report to one or more base stations. The beam and target group information report 954 is an example of the scanning signal report transmitted by the UE 302.

At stage 1108, the method includes receiving tracking signal configuration information indicating a tracking reference signal associated with the one or more target groups. The UE 302 is a means for receiving tracking signal configuration information. A base station 304 is configured to select sensing tracking reference signals (STRS) based on selected target groups. The STRS may be based on the SSRS beams identified in the scanning signal report transmitted at stage 1106. The tracking signal configuration information includes beam parameter information to enable the UE 302 to receive the STRS. In an example, the STRS may be QCLed with the corresponding SSRS received at stage 1102. The tracking and target group configuration information 958 is an example of the tracking signal configuration information and may include the target group identification information based on beam and target group information in the scanning signal report transmitted at stage 1106. The tracking signal configuration information may be transmitted via RRC, MAC-CE, DCI, or other network signaling. The tracking signal configuration information may be specific for a UE, or specific for one or more of the selected target groups. In an example, referring to FIG. 9B, when multiple target groups are associated with a signal STRS (e.g., STRS #A), the tracking signal configuration information indicates that the STRS is repeated a number of times equal to the number of target groups to be tracked. The tracking signal configuration information may also include the repetition pattern (e.g., period, time offset, interval, etc.) for the repeating STRS and the corresponding target group identifications for the target groups to be tracked.

At stage 1110, the method includes receiving the tracking reference signal identified in the tracking signal configuration information. The UE 302 is a means for receiving the tracking reference signal. In an example, the STRS may be based on communication reference signals such as SS Blocks, CSI-RS, TRS, and PRS. Other reference signals, and future reference signals developed for RF sensing applications may also be used.

At stage 1112, the method includes tracking one or more target groups associated with the tracking reference signal. The UE 302 is a means for tracking the one or more target groups. The UE 302 is configured to determine beam measurement information such as RSRP, RSRQ and SINR for the one or more tracking reference signals. The STRS is transmitted for each target group included in the tracking signal configuration information and the method 1100 iterates between stages 1110 and 1112 for each target group. For example, referring to FIG. 9B, three target groups including the first, second and third target groups are identified in the tracking signal configuration. The tracking reference signal (e.g., STRS #A) is transmitted three times based on the repetition pattern provided in the tracking signal configuration. As an example, and not a limitation, the period may be 0.1 ms, 0.5 ms, 1 ms, 10 ms, 20 ms, etc. Other repetition patterns may also be used. In an example, the UE 304 may be configured to provide updated signal measurement values based on the tracking reference signals. The updated measurement values may be included in a signal report which includes beam identification information, target group identification and the measurement values (e.g., RSRP, RSRQ, SINR, etc.). The signal report may be provided via RRC, MAC-CE, DCI, or other network signaling protocols.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

Implementation examples are described in the following numbered clauses:

1. A method of tracking targets with bistatic radio frequency sensing, comprising:
   receiving a scanning reference signal;
   generating a scanning signal report indicating one or more target groups associated with the scanning reference signal;
   transmitting the scanning signal report;
   receiving tracking signal configuration information indicating a tracking reference signal associated with the one or more target groups;
   receiving the tracking reference signal identified in the tracking signal configuration information; and
   tracking the one or more target groups associated with the tracking reference signal.

2. The method of clause 1 wherein indicating the one or more target groups includes generating target group identification information for each of the one or more target groups.

3. The method of clause 1 wherein receiving the tracking reference signal includes receiving the tracking reference signal once for each one of the one or more target groups.

4. The method of clause 1 wherein the tracking signal configuration information includes a repetition pattern for the tracking reference signal.

5. The method of clause 1 further comprising:
   determining a measurement value for the scanning reference signal with one or more receive beams;
   comparing the measurement value obtained on each of the one or more receive beams to a threshold value; and
   generating the scanning signal report based on the one or more receive beams with measurement values that are greater than the threshold value.

6. The method of clause 5 wherein the measurement value is at least one of a reference signal received power (RSRP), a reference signal received quality (RSRQ), and a signal-to-interference-plus-noise ratio (SINR).

7. The method of clause 1 wherein the scanning reference signal includes at least one selected from a group consisting of a positioning reference signal (PRS), a tracking reference signal (TRS), a channel state information reference signal (CSI-RS), and a synchronization signal block (SSB).

8. The method of clause 1 wherein the tracking signal configuration information is received via at least one of a radio resource control message, a medium access control control element, or a downlink control information message.

9. The method of clause 1 wherein the scanning signal report is transmitted via at least one radio resource control message.

10. The method of clause 1 wherein receiving the tracking reference signal is in response to transmitting a tracking request to a base station.

11. A method for single sided beam management in bistatic radio frequency sensing, comprising:
   transmitting a scanning reference signal;
   receiving a scanning signal report indicating one or more target groups associated with the scanning reference signal;
   transmitting tracking signal configuration information based on the scanning reference signal and the one or more target groups; and
   transmitting a tracking reference signal for each of the one or more target groups.

12. The method of clause 11 wherein the scanning reference signal includes at least one selected from a group consisting of a positioning reference signal (PRS), a tracking reference signal (TRS), a channel state information reference signal (CSI-RS), and a synchronization signal block (SSB).

13. The method of clause 11 wherein transmitting the tracking reference signal is in response to receiving a tracking request from a user equipment.

14. The method of clause 11 wherein the scanning signal report includes a signal identification value of the scanning reference signal.

15. The method of clause 14 wherein the scanning signal report includes one or more target group identification values associated with the scanning reference signal.

16. The method of clause 11 wherein the scanning signal report includes a receive beam associated with a user equipment and a measurement value for the scanning reference signal received via the receive beam.

17. The method of clause 11 wherein the tracking reference signal include at least one selected from a group consisting of a positioning reference signal (PRS), a tracking reference signal (TRS), a channel state information reference signal (CSI-RS), and a synchronization signal block (SSB).

18. The method of clause 11 wherein the tracking signal configuration information includes a repetition pattern for the tracking reference signal.

19. The method of clause 11 wherein the tracking signal configuration information includes target group identification information for each of the one or more target groups.

20. The method of clause 11 wherein the tracking signal configuration information is transmitted via at least one of a radio resource control message, a medium access control control element, or a downlink control information message.

21. An apparatus for tracking targets with bistatic radio frequency sensing, comprising:
a memory;
at least one transceiver;
at least one processor communicatively coupled to the memory and the at least one transceiver and configured to:
receive a scanning reference signal;
generate a scanning signal report indicating one or more target groups associated with the scanning reference signal;
transmit the scanning signal report;
receive tracking signal configuration information indicating a tracking reference signal associated with the one or more target groups;
receive the tracking reference signal identified in the tracking signal configuration information; and
track the one or more target groups associated with the tracking reference signal.

22. The apparatus of clause 21 wherein the at least one processor is further configured to generate target group identification information for each of the one or more target groups.

23. The apparatus of clause 21 wherein the at least one processor is further configured to receive the tracking reference signal once for each one of the one or more target groups.

24. The apparatus of clause 21 wherein the tracking signal configuration information includes a repetition pattern for the tracking reference signal.

25. The apparatus of clause 21 wherein the at least one processor is further configured to:
determine a measurement value for the scanning reference signal with one or more receive beams;
compare the measurement value obtained on each of the one or more receive beams to a threshold value; and
generate the scanning signal report based on the one or more receive beams with measurement values that are greater than the threshold value.

26. The apparatus of clause 25 wherein the measurement value is at least one of a reference signal received power (RSRP), a reference signal received quality (RSRQ), and a signal-to-interference-plus-noise ratio (SINR).

27. The apparatus of clause 21 wherein the scanning reference signal includes at least one selected from a group consisting of a positioning reference signal (PRS), a tracking reference signal (TRS), a channel state information reference signal (CSI-RS), and a synchronization signal block (SSB).

28. The apparatus of clause 21 wherein the tracking signal configuration information is received via at least one of a radio resource control message, a medium access control control element, or a downlink control information message.

29. The apparatus of clause 21 wherein the scanning signal report is transmitted via at least one radio resource control message.

30. The apparatus of clause 21 wherein receiving the tracking reference signal is in response to transmitting a tracking request to a base station.

31. An apparatus, comprising:
a memory;
at least one transceiver;
at least one processor communicatively coupled to the memory and the at least one transceiver and configured to:
transmit a scanning reference signal;
receive a scanning signal report indicating one or more target groups associated with the scanning reference signal;
transmit tracking signal configuration information based on the scanning reference signal and the one or more target groups; and
transmit a tracking reference signal for each of the one or more target groups.

32. The apparatus of clause 21 wherein the scanning reference signal includes at least one selected from a group consisting of a positioning reference signal (PRS), a tracking reference signal (TRS), a channel state information reference signal (CSI-RS), and a synchronization signal block (SSB).

33. The apparatus of clause 31 wherein transmitting the tracking reference signal is in response to receiving a tracking request from a user equipment.

34. The apparatus of clause 31 wherein the scanning signal report includes a signal identification value of the scanning reference signal.

35. The apparatus of clause 34 wherein the scanning signal report includes one or more target group identification values associated with the scanning reference signal.

36. The apparatus of clause 34 wherein the scanning signal report includes a receive beam associated with a user equipment and a measurement value for the scanning reference signal received via the receive beam.

37. The apparatus of clause 31 wherein the tracking reference signal include at least one selected from a group consisting of a positioning reference signal (PRS), a tracking reference signal (TRS), a channel state information reference signal (CSI-RS), and a synchronization signal block (SSB).

38. The apparatus of clause 31 wherein the tracking signal configuration information includes a repetition pattern for the tracking reference signal.

39. The apparatus of clause 31 wherein the tracking signal configuration information includes target group identification information for each of the one or more target groups.

40. The apparatus of clause 31 wherein the tracking signal configuration information is transmitted via at least one of a radio resource control message, a medium access control control element, or a downlink control information message.

41. An apparatus for tracking targets with bistatic radio frequency sensing, comprising:
    means for receiving a scanning reference signal;
    means for generating a scanning signal report indicating one or more target groups associated with the scanning reference signal;
    means for transmitting the scanning signal report;
    means for receiving tracking signal configuration information indicating a tracking reference signal associated with the one or more target groups;
    means for receiving the tracking reference signal identified in the tracking signal configuration information; and
    means for tracking the one or more target groups associated with the tracking reference signal.

42. An apparatus, comprising:
    means for transmitting a scanning reference signal;
    means for receiving a scanning signal report indicating one or more target groups associated with the scanning reference signal;
    means for transmitting tracking signal configuration information based on the scanning reference signal and the one or more target groups; and
    means for transmitting a tracking reference signal for each of the one or more target groups.

43. A non-transitory processor-readable storage medium comprising processor-readable instructions configured to cause one or more processors to track targets with bistatic radio frequency sensing, comprising:
    code for receiving a scanning reference signal;
    code for generating a scanning signal report indicating one or more target groups associated with the scanning reference signal;
    code for transmitting the scanning signal report;
    code for receiving tracking signal configuration information indicating a tracking reference signal associated with the one or more target groups;
    code for receiving the tracking reference signal identified in the tracking signal configuration information; and
    code for tracking the one or more target groups associated with the tracking reference signal.

44. A non-transitory processor-readable storage medium comprising processor-readable instructions configured to cause one or more processors to perform single sided beam management in bistatic radio frequency sensing, comprising:
    code for transmitting a scanning reference signal;
    code for receiving a scanning signal report indicating one or more target groups associated with the scanning reference signal;
    code for transmitting tracking signal configuration information based on the scanning reference signal and the one or more target groups; and
    code for transmitting a tracking reference signal for each of the one or more target groups.

What is claimed is:

1. A method of tracking targets with bistatic radio frequency sensing, comprising:
    receiving a scanning reference signal;
    generating a scanning signal report indicating one or more target groups associated with the scanning reference signal;
    transmitting the scanning signal report;
    receiving tracking signal configuration information indicating a tracking reference signal associated with the one or more target groups, wherein the tracking signal configuration information includes target group identification information for each of the one or more target groups;
    receiving the tracking reference signal identified in the tracking signal configuration information; and
    tracking the one or more target groups associated with the tracking reference signal.

2. The method of claim 1 wherein indicating the one or more target groups includes generating target group identification information for each of the one or more target groups.

3. The method of claim 1 wherein receiving the tracking reference signal includes receiving the tracking reference signal once for each one of the one or more target groups.

4. The method of claim 1 wherein the tracking signal configuration information includes a repetition pattern for the tracking reference signal.

5. The method of claim 1 further comprising:
    determining a measurement value for the scanning reference signal with one or more receive beams;
    comparing the measurement value obtained on each of the one or more receive beams to a threshold value; and
    generating the scanning signal report based on the one or more receive beams with measurement values that are greater than the threshold value.

6. The method of claim 5 wherein the measurement value is at least one of a reference signal received power (RSRP), a reference signal received quality (RSRQ), and a signal-to-interference-plus-noise ratio (SINR).

7. The method of claim 1 wherein the scanning reference signal includes at least one selected from a group consisting of a positioning reference signal (PRS), a tracking reference signal (TRS), a channel state information reference signal (CSI-RS), and a synchronization signal block (SSB).

8. The method of claim 1 wherein the tracking signal configuration information is received via at least one of a radio resource control message, a medium access control control element, or a downlink control information message.

9. The method of claim 1 wherein the scanning signal report is transmitted via at least one radio resource control message.

10. The method of claim 1 wherein receiving the tracking reference signal is in response to transmitting a tracking request to a base station.

11. A method for single sided beam management in bistatic radio frequency sensing, comprising:
    transmitting a scanning reference signal;
    receiving a scanning signal report indicating one or more target groups associated with the scanning reference signal;
    transmitting tracking signal configuration information based on the scanning reference signal and the one or more target groups, wherein the tracking signal configuration information includes target group identification information for each of the one or more target groups; and transmitting a tracking reference signal for each of the one or more target groups.

12. The method of claim 11 wherein the scanning reference signal includes at least one selected from a group consisting of a positioning reference signal (PRS), a tracking reference signal (TRS), a channel state information reference signal (CSI-RS), and a synchronization signal block (SSB).

13. The method of claim 11 wherein transmitting the tracking reference signal is in response to receiving a tracking request from a user equipment.

14. The method of claim 11 wherein the scanning signal report includes a signal identification value of the scanning reference signal.

15. The method of claim 14 wherein the scanning signal report includes one or more target group identification values associated with the scanning reference signal.

16. The method of claim 11 wherein the scanning signal report includes a receive beam associated with a user equipment and a measurement value for the scanning reference signal received via the receive beam.

17. The method of claim 11 wherein the tracking reference signal include at least one selected from a group consisting of a positioning reference signal (PRS), a tracking reference signal (TRS), a channel state information reference signal (CSI-RS), and a synchronization signal block (SSB).

18. The method of claim 11 wherein the tracking signal configuration information includes a repetition pattern for the tracking reference signal.

19. The method of claim 11 wherein the tracking signal configuration information is transmitted via at least one of a radio resource control message, a medium access control control element, or a downlink control information message.

20. An apparatus for tracking targets with bistatic radio frequency sensing, comprising:
a memory;
at least one transceiver;
at least one processor communicatively coupled to the memory and the at least one transceiver and configured to:
receive a scanning reference signal;
generate a scanning signal report indicating one or more target groups associated with the scanning reference signal;
transmit the scanning signal report;
receive tracking signal configuration information indicating a tracking reference signal associated with the one or more target groups, wherein the tracking signal configuration information includes target group identification information for each of the one or more target groups;
receive the tracking reference signal identified in the tracking signal configuration information; and
track the one or more target groups associated with the tracking reference signal.

21. The apparatus of claim 20 wherein the at least one processor is further configured to generate target group identification information for each of the one or more target groups.

22. The apparatus of claim 20 wherein the at least one processor is further configured to receive the tracking reference signal once for each one of the one or more target groups.

23. The apparatus of claim 20 wherein the tracking signal configuration information includes a repetition pattern for the tracking reference signal.

24. The apparatus of claim 20 wherein the at least one processor is further configured to:
determine a measurement value for the scanning reference signal with one or more receive beams;
compare the measurement value obtained on each of the one or more receive beams to a threshold value; and
generate the scanning signal report based on the one or more receive beams with measurement values that are greater than the threshold value.

25. An apparatus, comprising:
a memory;
at least one transceiver;
at least one processor communicatively coupled to the memory and the at least one transceiver and configured to:
transmit a scanning reference signal;
receive a scanning signal report indicating one or more target groups associated with the scanning reference signal;
transmit tracking signal configuration information based on the scanning reference signal and the one or more target groups, wherein the tracking signal configuration information includes target group identification information for each of the one or more target groups; and
transmit a tracking reference signal for each of the one or more target groups.

26. The apparatus of claim 25 wherein the scanning reference signal includes at least one selected from a group consisting of a positioning reference signal (PRS), a tracking reference signal (TRS), a channel state information reference signal (CSI-RS), and a synchronization signal block (SSB).

27. The apparatus of claim 25 wherein the scanning signal report includes a signal identification value of the scanning reference signal and one or more target group identification values associated with the scanning reference signal.

28. The apparatus of claim 25 wherein the tracking signal configuration information includes a repetition pattern for the tracking reference signal.

* * * * *